United States Patent [19]

Bernard et al.

[11] Patent Number: 5,209,431

[45] Date of Patent: May 11, 1993

[54] DEVICE FOR INCREASING THE STABILITY OF HELICOPTERS PLACED ON BOARD AND SET DOWN, HAVING A TRICYCLE LANDING GEAR, AND HELICOPTER EQUIPPED WITH SUCH A DEVICE

[75] Inventors: Louis A. Bernard, Saint Victoret; René Thomassin, Velaux, both of, France

[73] Assignee: Aerospatiale Society Nationale Industrielle, Paris, France

[21] Appl. No.: 627,181

[22] Filed: Jan. 24, 1991

Related U.S. Application Data

[62] Division of Ser. No. 297,521, Jan. 17, 1989, Pat. No. 4,995,574.

[30] Foreign Application Priority Data

Jan. 15, 1988 [FR] France .................. 88 00443

[51] Int. Cl.$^5$ .............................................. B64C 25/06
[52] U.S. Cl. ............................. 244/17.17; 244/100 R; 244/115
[58] Field of Search .................. 244/17.17, 50, 100 R, 244/102 R, 104 R, 104 CS; 180/904

[56] References Cited

U.S. PATENT DOCUMENTS

| | | | |
|---|---|---|---|
| 2,826,434 | 3/1958 | Echols | 244/50 |
| 3,049,253 | 8/1962 | Cabral | 180/904 |
| 4,537,369 | 8/1985 | Perry | 244/50 |

FOREIGN PATENT DOCUMENTS

1198208  8/1965  Fed. Rep. of Germany ...... 180/904

*Primary Examiner*—Galen Barefoot
*Attorney, Agent, or Firm*—Pollock, Vande Sande & Priddy

[57] ABSTRACT

The invention relates to a device for increasing the stability, especially the lateral stability, of a helicopter placed on board (1) having a tricycle landing gear (2, 6), when it is set down on a moving platform.

The device comprises two lateral stabilizers (13), each equipped with a wheel (16) for support on the platform and connected to the structure of the helicopter by an essentially rigid support, comprising a leg (17), about the axis of which the wheel (16) can turn, the leg (17) itself being connected to the structure by a rigid and transverse component which may be a pivot axle if the leg can be raised, or a slidingly fitted arm if the stabilizer (13) is additional. The stabilizers may also be integrated into a towing trolley.

Application to the equipment of helicopters placed on board, having a tricycle landing gear.

4 Claims, 8 Drawing Sheets

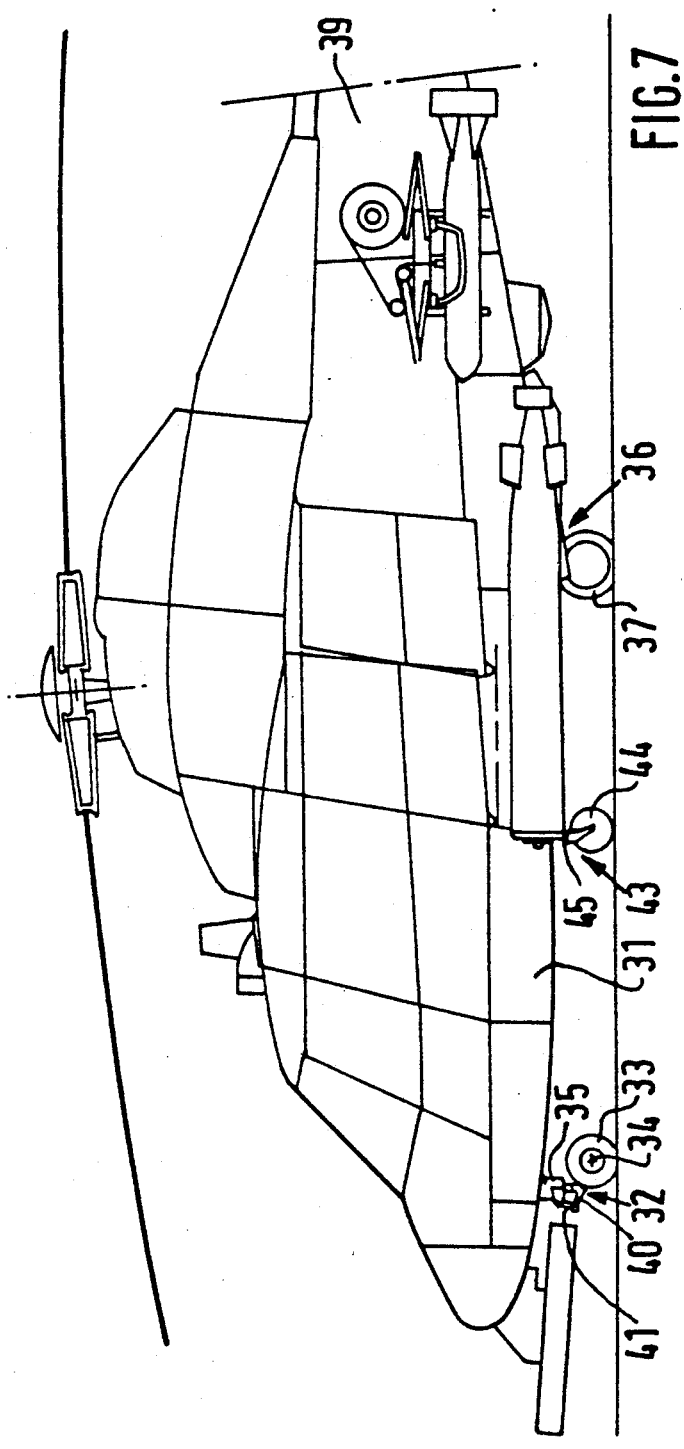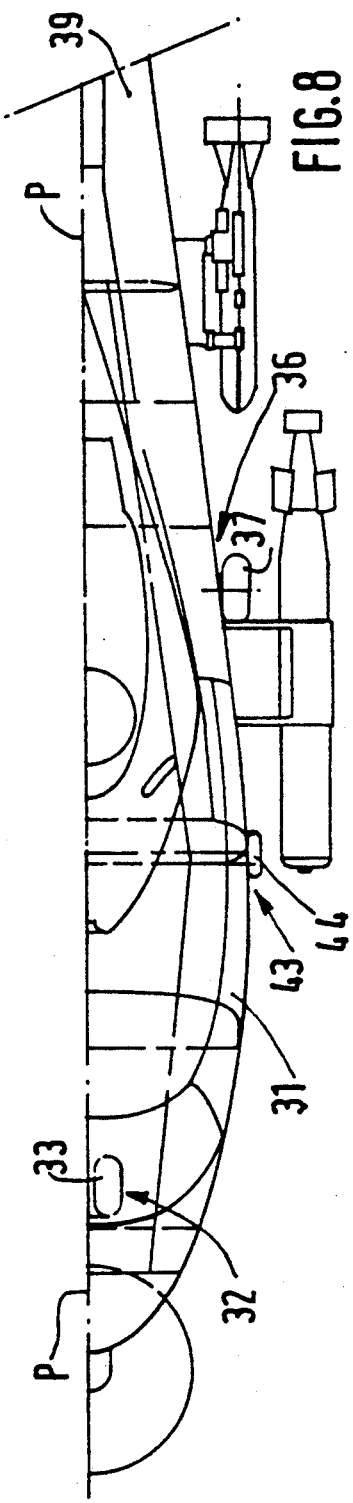

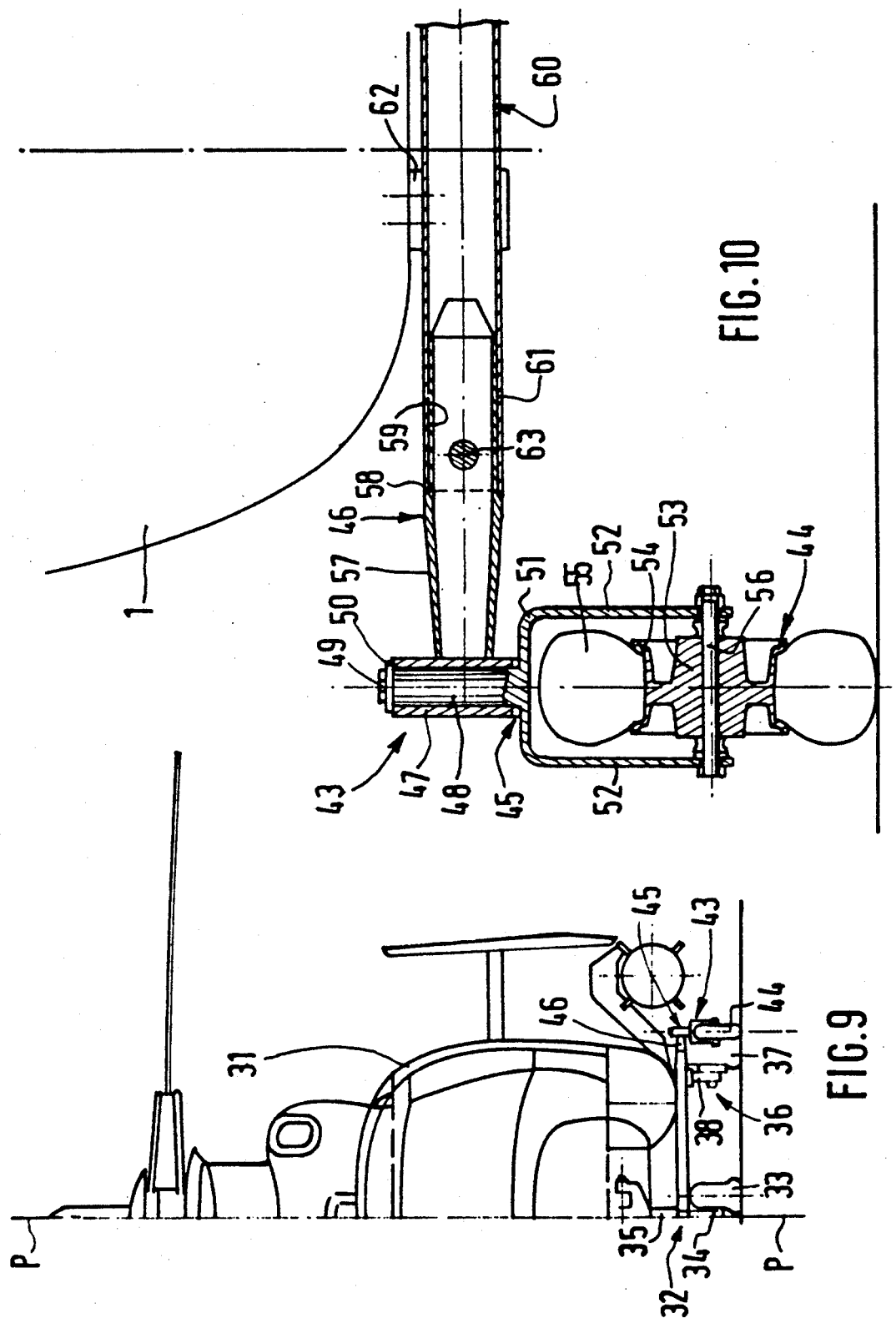

DEVICE FOR INCREASING THE STABILITY OF HELICOPTERS PLACED ON BOARD AND SET DOWN, HAVING A TRICYCLE LANDING GEAR, AND HELICOPTER EQUIPPED WITH SUCH A DEVICE

This is a division of application Ser. No. 07/297,521, filed Jan. 17, 1989, now U.S. Pat. No. 4,995,574.

FIELD OF THE INVENTION

The present invention relates to a device for increasing the stability of helicopters having a tricycle landing gear, upon alighting when they are set down.

More specifically, the invention relates to such a device permitting the improvement, after their alighting, of the stability, especially the transverse stability, of helicopters placed on board a vessel the landing gear of which, of the type referred to as a "tricycle" landing gear, comprises two principal and lateral undercarriages, which may be fixed or retractable, having a single wheel or twin wheels, for example disposed side by side in accordance with a mounting referred to as a "diabolo" mounting, and an auxiliary undercarriage, which is either fixed or retractable front undercarriage, having a single wheel or having twin wheels, or an undercarriage which is essentially limited to a small rear wheel.

A device according to the invention is intended against improve the stability to lateral reversal of such helicopters, with Qr without a crosswind, and after they have been set down on a moving platform, such as an alighting and takeoff platform of a ship, for example an aircraft carrier, or alternatively a "helicopter" deck of a marine working platform, especially of the "self-elevating" type, which is caused to move in the manner of a barge from one work site to another, and is then subjected to the effects of the waves and of the swell, and thus to rolling and pitching movements, and this improved stability against tipping of the helicopters must be ensured not only under static conditions, on the moving alighting and takeoff area, but also during hauling/ during the movements of the helicopters in this area and between the latter and a garage or hangar provided on the ship or the platform to shelter the helicopters.

BACKGROUND OF THE INVENTION

In the case of helicopters which have to alight on a moving platform, it is already known from French Patent No. 1,241,147 to equip their landing gear with a controlled-adhesion device, comprising a large number of suction cups which are mounted to be retractable at the lower part of buoyancy tanks with which the helicopter is equipped. A large number of these suction cups are carried by a rubberized cloth closing the lower opening of a semicylindrical rigid shell, which is open towards the bottom and is rigidly mounted within the lower part of each buoyancy tank. In the recess delimited between the suction-cup-carrying rubberized cloth and the rigid shell, within the latter, there is disposed a sealed bladder made integral in places, on the one hand with the rigid shell and on the other hand with the cloth, which exhibits numerous openings, laterally in relation to the central suction cups, each one of which is likewise pierced by a small central channel. The sealed bladder may be pressurized from a compressed air connection on the outlet of the compressor of a turbine of the helicopter, or placed under reduced pressure by aspiration of the air which it contains by means of an ejector, the central nozzle of which is directly supplied from this air connection. The pressurization of the bladder ensures its inflation in the form of a cylindrical bulge, which pushes back the suction-cup-carrying cloth and the suction cups projecting towards the exterior of the rigid shell, i.e. projecting under the corresponding buoyancy tank and, simultaneously, the occultation of the small central channels for placing the suction cups in communication with atmosphere. Conversely, the placing of the bladder under reduced pressure retracts the suction-cup-carrying cloth and the suction cups towards the interior of the shell, and ensures the placing of the small central channels of the suction cups in communication with atmosphere.

Before executing the approach of the helicopter for alighting, the pilot ensures that the bladder is pressurized, and thus that the suction cups are moved out, with a view to the alighting, and are ready to adhere to the platform. At the moment of the impact on alighting, the adhesion of the suction cups on the platform takes place quasi-instantaneously as a result of the expulsion of the air via the edges of the latter in the course of their crushing under the effect of the distributed weight of the helicopter; this prevents any bounce and fixes the helicopter to the platform, the large number of suction cups permitting the alleviation of any possible lack of adhesion of some of them, on account of the quality of the surface condition of the platform or of its soiling.

In order to take off, the pilot instructs the depressurization of the bladder when he pulls on the control for the general pitch of the helicopter, in such a way that this depressurization ensures the simultaneous placing of all the suction cups in communication with atmosphere, at the same time as the retraction of the suction-cup-carrying cloth towards the interior of the rigid shell, in such a way that the helicopter is instantaneously released from the platform.

Thus, this device with controlled adhesion constitutes a device for fixing the helicopter on the platform, or alternatively an independent means for rapid docking, comprising numerous anchoring points, each one of which corresponds to a suction cup, and for which the docking and the release are simultaneous. It results from this that such a device effectively ensures an increase of stability of the helicopter set down, and thus an improvement in the stability against overturning of this helicopter, but only under static conditions. Such a device is unusable during hauling, and it even opposes the latter, when it is active, i.e. when the adhesion of the suction cups is utilized. Consequently, in order to permit hauling, it is necessary to disable this device, in such a way that the improved stability which it procured under static conditions is then no longer ensured. It is therefore necessary to use another device, such as a trolley, for hauling, this handling trolley having to be slid under the helicopter which has been set down, while the bladder is maintained under pressure, the handling trolley being adapted to permit the movement of the helicopter once the bladder has been deflated, and consequently the suction cups retracted. Such an auxiliary trolley is absolutely essential since, in the case where the helicopter comprises a wheeled landing gear, the undercarriages of this gear cannot be used, on account of the fact that, in this case, the use of the controlled-adhesion device assumes specifically that the wheeled landing gear is retracted or cleared, with a view to utilization of the corresponding helicopter on a moving platform.

In fact, the controlled-adhesion device according to the French patent can be used only on helicopters equipped with a gear with floats, or with a wheeled gear subject to the condition that the helicopter is furthermore equipped with an emergency buoyancy device with buoyancy tanks disposed at its lower part, or alternatively that the helicopter is a hydro or amphibious helicopter, but in these last cases the wheeled landing gear must always be retracted or cleared in order to make it possible for the device with retractable suction cups to be used.

In conclusion, the device for controlled adhesion by retractable suction cups according to the French patent is functionally incompatible with a tricycle landing gear, of which the two principal undercarriages and the auxiliary front or rear undercarriage are effectively used for alighting and takeoff on a moving platform.

French Patent No. 2,544,280 discloses a landing gear, especially for an amphibious helicopter, the waterline of which is provided by the fuselage per se of the helicopter, and for which it is necessary to ensure the transverse balance. The landing gear is designed in such a manner as to ensure, on the one hand, the normal function of undercarriage on land or on a platform, and, on the other hand, the transverse stabilization of the helicopter on the water or under flood conditions, to the extent that the waterline is provided by the fuselage of the helicopter. To this end, each one of the two principal and lateral undercarriages is articulated on the fuselage about an axis inclined in the horizontal plane and the corresponding leg of the undercarriage is provided with a wheel and with a fairing in the form of a float, and each principal undercarriage is maneuvered by a control device permitting the movement thereof from a low position, suitable for alighting or takeoff on land or on a platform, and a high position, in which the float fairing ensures lateral stability under flood conditions and presents a correct incidence for hydroplaning.

It is clear that such a device increases the lateral stability of the helicopter solely when the latter is set down on the water since, when it is set down on land, or on a rigid platform, the wheeled undercarriages which constitute the lateral stabilizers under flood conditions are used in a conventional manner, and therefore do not procure any increase or improvement in stability.

On the other hand, numerous constructions are known of devices or of toolings intended exclusively to facilitate the ground movements of helicopters equipped solely with a landing gear with skids.

By way of example, British Patent No. 1,382,265 discloses a towing trolley comprising a frame mounted on wheels at each end, which trolley is equipped with a direction control at one end and moved by a motor which drives the wheels at the other end, the frame supporting a haulage device for producing a relative movement between the trolley and a helicopter with skids, and the trolley is equipped with two tracks, which are preferably equipped with rollers, to receive the skids of the helicopter, the haulage device being preferably driven by the same motor as the wheels of the trolley.

It is clear that such a trolley is a relatively heavy and bulky device, since not only must it be equipped with a motor and with its power supply, to move the helicopter, but it must also carry the latter, and for this purpose have available assistance in the lifting of the helicopter for loading thereof onto the trolley. Moreover, such a carrying trolley, which is specifically adapted for the movement of helicopters with skids, does not procure any increase in the lateral stability of the helicopter, in particular during loading onto the trolley, on account of the fact that the front or the rear of the helicopter must be slightly lifted, and even in a general way, when the helicopter rests on the carrying trolley, under static conditions just as during the hauling of the trolley, on account of the fact that the points of contact of the carrying trolley with the ground, namely the wheels of the carrying trolley, are disposed within the skids, and therefore closer to the longitudinal and median plane of the helicopter and, with regard to the points of contact at the front of the trolley, closer to the center of gravity of the helicopter. Moreover the hand, and that, on the other hand, the center of gravity of the helicopter is elevated in relation to its position when the helicopter is resting on its skids. In conclusion, the stability, especially the transverse stability, of a helicopter with a landing gear with skids is diminished when the latter is resting on such a ground movement trolley.

The same applies when use is made of a trolley according to U.S. Pat. No. 4,033,422, which describes a small trolley, the self-powered frame of which is equipped with at least two coaxial wheels, with a motor for driving the wheels and with a jack lifting system intended to come into contact with a stable point on the lower face of the structure of the helicopter. This frame is equipped with a direction control arm, the operating handle of which is equipped with the components for controlling the drive motor and the lifting jack, and this small trolley is used in combination with two auxiliary wheeled gears, each one of which is intended to be fixed to the back of one of the two skids of the helicopter.

Such a handling trolley is relatively costly, heavy and complex, on account of the fact that it carries electrical batteries for the supply to the motor for driving the wheels, as well as to a motor for driving a pump of a hydraulic circuit for supplying power to the lifting jack. As previously, the lateral stability of the helicopter received by the handling trolley and its auxiliary rear rolling gears is diminished under static conditions, just as when hauling, on account of the "three point" support on the ground, at the location, on the one hand, of the wheels of the trolley, which are disposed at the front between the two skids and, on the other hand, at the location of the auxiliary rolling gears at the rear of the skids.

In conclusion, such handling trolleys are unusable on the moving platforms, on account of the fact that they diminish the stability, especially the lateral stability, of helicopters with skids which they transport and, on the other hand, they are specifically adapted for helicopters with a landing gear with skids, and cannot be used on helicopters having a tricycle landing gear, the undercarriages of which are used on alighting, just as on takeoff, on such moving platforms.

It should furthermore be noted that such handling trolleys, which slide under the helicopters with skids, are incompatible with the majority of the alighting aid devices, for example of the "grid-harpoon" type, with which the moving platforms may advantageously be provided in order to ensure excellent stability against overturning of the helicopters which they receive.

It should further be noted that the helicopters placed on board are not, in general, equipped with a landing gear with skids, since these types of undercarriages do not exhibit sufficient elasticity and do not ensure sufficient damping in the vertical direction to permit, under good conditions, a landing on a moving platform, especially since the vertical component of the speed of relative movement of the helicopter and of the platform exceeds 3 m/s. On the other hand, as already set forth hereinabove in relation to the British and American patents, the landing gears with skids do not permit, without the assistance of an auxiliary device, the movement of the helicopters on the alighting platforms with sufficient security, in particular with regard to braking.

For these various reasons, the great majority of helicopters placed on board consists of helicopters equipped with a wheeled landing gear. Having regard to the fairly limited number of helicopters placed on board, the latter are items of equipment which are in general derived from helicopters designed and devised for a utilization from bases situated on solid ground or land-based platforms, possibly on an incline, but never moving. Consequently, these helicopters are therefore equipped with a landing gear of the tricycle type, with a front or rear auxiliary undercarriage, and the two principal and lateral undercarriages of which exhibit a relatively small track, in order to be less heavy and to give rise to an aerodynamic drag which is as small as possible. However, on account of the relatively small track of the principal undercarriages, these tricycle landing gears do not impart to helicopters which are equipped therewith a lateral stability which is sufficient to permit, without a risk of tipping over, especially laterally, the placing of these helicopters on board, on the deck of ships undergoing, with their alighting platforms, intense rolling and pitching movements, as is the case, for example, with frigates and corvettes, with, in addition, the possibility of likewise encountering strong side winds which are troublesome for alightings and takeoffs, as well as for the maneuvers of the helicopters which have been set down, as is the case, for example, on the decks of aircraft carriers (helicopter carriers or airplane carriers).

It is recalled that, when a helicopter wishes to be set down on an inclined land-based platform, it approaches facing the incline and, after having been set down on the platform, it therefore utilizes, in order to maintain itself on the latter, its longitudinal stability which is, in general, far greater than its transverse or lateral stability. However, for a helicopter which has been placed on board and which wishes to alight on a platform which is movable along all axes, this alighting procedure cannot be adopted.

For a better perception of the problem posed, it is recalled that the average lateral static stability of a helicopter having a tricycle gear with a front auxiliary undercarriage is approximately 20°; this substantially signifies that the longitudinal and median plane passing through the center of gravity of the helicopter may be inclined by a maximum angle of 20° to the vertical without risk of lateral tipping-over of the helicopter. Such stability is certainly sufficient for a civil land-based utilization of the helicopter, but the static stability desirable for a helicopter placed on board is approximately 30°.

In order to bring the critical angle of lateral inclination to approximately 30° on helicopters having a tricycle gear with a front auxiliary undercarriage, a first evident solution consists in increasing the track in the main undercarriages. However, the improvement of stability by increasing the track of the main undercarriages presents numerous disadvantages, since it necessitates a significant structural modification of the basic helicopter, a certification of the new undercarriages, and it involves an increase of the bulkiness of the helicopter on the ground, a larger aerodynamic drag and thus very substantial losses of performance, as well as the practical obligation to increase the diameter of the useful surface on the alighting platform, and the dimensions of a possible alighting assistance device equipping this platform, for example a device comprising a grid implanted in the central part of the alighting area and cooperating with a harpoon mounted below the helicopter.

SUMMARY OF THE INVENTION

The object of the invention is to remedy these disadvantages and to permit the improvement in stability, especially lateral stability, of a helicopter placed on board, having a tricycle landing gear, the undercarriages of which are effectively used on alighting, just as on takeoff, as well as for the hauling of the helicopter when the latter is set down on the moving platform, this taking place without any necessity to effect a significant structural modification of the helicopter, as it is designed for a land-based utilization, and thus without necessitating new modifications of the main and lateral undercarriages, without giving rise to an increase of the bulkiness on the ground, of the aerodynamic drag in flight, and thus without giving rise to substantial losses of performance levels.

Another object of the invention is to permit the utilization, under extreme conditions of marine application, with intense movements of platform and side winds, of the helicopters placed on board which are equipped with a tricycle landing gear and which have been devised for their land-based application, without significant addition to cost or to weight, and permitting, without any other supplementary tooling, the movements of these helicopters on the deck of ships by hauling and with the use of the wheels of the tricycle landing gear, as well as their braking system.

Yet a further object of the invention is to improve or to increase the stability, especially the lateral stability, of the helicopters placed on board having a tricycle landing gear, when they are set down on a moving platform, with the aid of a device of simple structure, of low weight and bulkiness, and therefore of a modest construction and maintenance cost, this device being at the same time independent of any device for helicopter docking on a moving platform, after alighting and before takeoff, while being able to tolerate the various known types of such devices for assisting alighting, i.e., that the device for increasing stability according to the invention must be able to be used under static conditions as well as for hauling of the helicopter on the moving platform, without obstructing the functioning of such a device for assisting alighting, and without being obstructed by the latter.

In order to achieve these objects, the principle underlying the invention does not consist in increasing the track of the main undercarriages of the tricycle gear, nor in varying the adhesion, but in increasing the number of points of support of the helicopter on the alighting surface, without however departing too much from the projection onto this surface of the fuselage of the helicopter, the new points of support being selected on both sides of the longitudinal and median plane of the helicopter and offset from the trace of the center of gravity on the plane of the alighting surface, in order to increase the support polygon.

The idea underlying the invention consists in improving the stability, especially the lateral stability, of a helicopter having a tricycle landing gear and which is placed on board on a moving platform by addition of at least two supplementary lateral wheels, without very substantially modifying the basic structure of the helicopter or the original tricycle landing gear, in order to bring the critical angle of inclination to approximately 30°, these supplementary lateral wheels being either retractable, and thus lifted before takeoff and lowered after alighting by a hydraulic or electrical control operated by the pilot, or simply placed in position and demounted manually by a quick-acting coupling mechanism, following alighting and before takeoff, respectively, in which case said supplementary lateral wheels may be combined with coupling and towing elements, which constitute a stabilizing and towing trolley.

More specifically, the invention proposes a device for increasing the stability, especially the lateral stability, of a helicopter placed on board, having a tricycle landing gear, when it is set down on a moving platform, and which is defined in that it comprises an auxiliary stabilizing gear, comprising at least two lateral stabilizers, each one of which comprises a rigid support, which supports, by an end part, at least one stabilizing wheel for contact with the platform, and which is, at least in the position of use, made integral with the stable structure of the helicopter at the lower part of the fuselage of the latter, and offset laterally on one respectively of both side of the vertical and median longitudinal plane of the helicopter, and in the direction turned towards the auxiliary undercarriage in relation to the main and lateral undercarriages of the tricycle landing gear, in such a manner that the stabilizing wheels are supported on said moving platform on both sides of said longitudinal and median plane of the helicopter, when the latter rests on this platform by its tricycle landing gear.

It is certain that the improvement or the increase in thus stability thus obtained by the mounting, below the helicopter, of an auxiliary stabilizing gear necessitates a very localized reinforcement of the basic stable structure of the helicopter but does not engender any consequent structural modification of this helicopter or the certification in flight of the lateral stabilizers, on account of the fact that the latter do not participate in the absorption of the alighting forces. Moreover, such a device for increasing stability does not engender any increase in bulkiness, on the ground, of the helicopter, which utilizes its tricycle landing gear for alighting as well as takeoff, and has the benefit of the assistance of the lateral stabilizers of the auxiliary stabilizing gear in order to achieve a high stability, especially lateral or transverse stability, not only when it is set down on the moving alighting platform, but also during hauling between this platform and a hangar accommodating the helicopter between missions.

In order to facilitate the mounting of the auxiliary stabilizing gear, and all the operations on the latter, and in order likewise to modify to the least possible extent the basic structure of the helicopter, while benefiting from a broad support polygon, it is advantageous that the rigid support of each one of the lateral stabilizers be mounted to project laterally in relation to the lower part of the fuselage and on one side of this fuselage. Such a device for increasing the stability permits the critical angle to be brought to approximately 30°; this permits the utilization of helicopters placed on board which are equipped therewith under extreme conditions of marine application, when the moving platform is subjected to movements of large amplitude and is swept by violent side winds.

In order to facilitate the maneuvers and movements of helicopters placed on board and equipped with a device for increasing stability according to the invention, on the decks of ships, it is advantageous that, on each one of the lateral stabilizers of the auxiliary stabilizing gear, the corresponding rigid support comprises a leg which exhibits, at least in the position of use, at least one substantially vertical lower end part supporting each wheel of the corresponding lateral stabilizer, which is, on the one hand, mounted to turn freely about the substantially vertical axis of said leg lower end part and, on the other hand, mounted so as to be free to rotate about its own axis.

According to the best embodiment known to the applicant at the present time, the leg of the rigid support comprises a tubular shaft exhibiting a rectilinear internal bore, the axis of which is at least in the position of use of the leg, substantially vertical, and in which there is engaged a rod which turns freely about its axis and an end part of which, projecting outside the tubular shaft, supports at least one stabilizing wheel turning about its axis perpendicular to that of the tubular shaft.

In order to obtain a further improvement in the behavior on hauling of the lateral stabilizers, it is advantageous that the rod end part projecting outside the tubular shaft of the leg be conformed as a wheel-carrying cap, in which each corresponding stabilizing wheel is mounted in rotation about its own axis, which is offset in relation to the axis of the rod, in such a manner that each stabilizing wheel is entrained as a drawn wheel when the helicopter is moved on the moving platform.

In order to promote the support of each stabilizing wheel against the moving platform, and in the case of lateral inclination of the helicopter, in order to exert on the latter a restoring force towards its stable position, the rod and each wheel which it supports are advantageously pushed back resiliently towards the outside of the shaft of the leg of each lateral stabilizer by at least one resilient restoring component having high stiffness, which is advantageously at least partially accommodated in the shaft and/or about the rod.

Moreover, in order to permit the adjustment of the height of each lateral stabilizer of the auxiliary stabilizing gear as a function of the mass of the helicopter, it is advantageous that each lateral stabilizer should comprise a mechanism for regulating the position of at least one corresponding stabilizing wheel in height in relation to the fuselage of the machine. This mechanism for regulating the height of a stabilizing wheel may comprise a hydraulic jack accommodated in the tubular shaft of the leg and which ensures an axial regulation of the position in this shaft of the rod supporting the stabilizing wheel. Advantageously, this mechanism for regulating the height of at least one stabilizing wheel is a mechanism comprising a toothed wheel operated by a crank and in engagement with a pinion for entrainment in rotation of an endless screw in an axial position fixed in relation to the tubular shaft in which it is at least partially accommodated, and in engagement with a slider guided in axial translation in said shaft and in which a spindle supporting the stabilizing wheel or wheels is mounted so as to turn.

Having regard to the preferred position of each lateral stabilizer leg, in slight lateral offset in relation to the lower part of the fuselage, and on one side of the latter, the rigid support of each lateral stabilizer likewise comprises a rigid and substantially transverse component, connected to the corresponding leg and connecting the latter to the stable structure of the helicopter.

According to a first preferred modified embodiment, each lateral stabilizer is connected permanently to the structure of the helicopter and carried in flight by the latter, and the lateral stabilizer is, where possible, demounted and removed from this structure of the helicopter only for maintenance and servicing operations.

In this case, the lateral stabilizers may be stationary, and such that their rigid supports are maintained in positions which are fixed in relation to the structure of the helicopter, but such a construction is disadvantageous to the extent that it involves substantial aerodynamic drag, giving rise to significant losses in performance. For this reason, and according to the best embodiment known to applicants, the lateral stabilizers are retractable, and each of them comprises a rigid support mounted so as to be movable between two extreme positions in relation to the fuselage of the helicopter, and in each of which it is intended to be locked, one of these two positions being a position of use, in which the corresponding stabilizing wheel or wheels have descended in relation to the fuselage, and the other being a position of rest, in which the corresponding wheel or wheels are raised substantially to the level of the fuselage, the rigid support being displaced from one to the other of these two positions by at least one operating actuator.

In this configuration of the auxiliary stabilizing gear having retractable lateral stabilizers, it is advantageous that the substantially transverse rigid component which connects the leg of each stabilizer to the structure of the helicopter be a pivot axle which is substantially horizontal and substantially perpendicular to the vertical and median longitudinal plane of the helicopter, and with which or about which the corresponding leg is mounted so as to pivot in a substantially longitudinal direction, at least one operating actuator being a jack, and the leg being furthermore crossbraced in the lowered position by at least one strut.

According to a simple and inexpensive construction, each lateral stabilizer leg is pivoted by a single hydraulic or electrical operating and crossbracing jack, fulfilling at the same time the function of a strut for crossbracing the leg in the lowered position.

In this example, in order that the retracted lateral stabilizers should offer virtually no supplementary aerodynamic drag, and in order not to have to modify the fuselage and the basic structure of the helicopter, it is advantageous that each lateral stabilizer be accommodated, in the raised position, in a trap provided in a small lateral and faired vessel fixed on the the corresponding side of the lower part of the fuselage.

The advantage of such a configuration is that the utilization of the device for increasing stability of the helicopter is freely available to the pilot of the latter, who is therefore independent and can lower the lateral stabilizers after alighting and can raise them before takeoff, without necessitating any assistance from deck personnel.

However, if it is preferred to limit to the greatest possible extent the increase in weight resulting for the helicopter from its adaptation to the mounting of such a device for increasing stability, i.e., if the increase of the weight of the helicopter is be limited to the weight of the structural elements of small size which must be added to it for fixing the lateral stabilizers, and if it is desired at the same time not to increase the aerodynamic drag by carrying the lateral stabilizers, it is advantageous, according to another embodiment specific to the invention, that the auxiliary stabilizing gear be an additional gear, mounted on the helicopter in addition to the tricycle landing gear after alighting on said moving platform, and demounted before the takeoff of the helicopter, and with which the rigid support of each stabilizer is made integral laterally in a removable manner on the structure of the helicopter.

Advantageously, in order that the improved stability should be ensured immediately after alighting and until the final moments before takeoff, it is advantageous that the removable integration of each lateral stabilizer with the structure of the helicopter be ensured by a quick-acting coupling and uncoupling mechanism, with manual activation, which can be easily and rapidly operated by deck personnel giving assistance to the helicopter, which is therefore no longer independent in the use of the device for increasing stability, but with which the workload of the pilot is at the same time diminished, the helicopter being furthermore lightened and exhibiting lower aerodynamic drag than in the variant presented hereinabove, in which the lateral stabilizers are permanently on the helicopter and retractable on the latter.

In the configuration of the device for increasing stability, as presented hereinabove, it is advantageous that the substantially transverse rigid component connecting the leg of each stabilizer to the structure of the helicopter be a lateral arm which is integral with the leg and which is fitted onto and/or into at least one element of this stable structure, on which it is retained in a removable manner by the manual engagement of at least one pin in coincident orifices formed in the arm and in at least one element of this stable structure of the helicopter.

In this variant, each lateral stabilizer of the auxiliary stabilizing gear is therefore removable individually and independently of the other, in such a way that the risks of interference of such a device with a device for assisting in the course of alighting, for example of the grid-harpoon type and/or of the type having a trolley and having a guiding and towing bar, are minimal.

As regards helicopters placed on board an aircraft carrier, it is known that the critical phase for the stability of the aircraft is the towing of the latter, since the aircraft are then exposed to crosswinds.

In order to increase the stability of the helicopters placed on board and to fit them for their towing, under such conditions of use, the invention proposes a particularly advantageous embodiment of additional auxiliary-stabilizing gears, on which each lateral stabilizer is integral with an end part of one of two lateral branches of a stabilizing and towing trolley, on which the opposite end parts of the two branches are joined at the location of an operating component.

In this configuration, the leg of each lateral stabilizer is rigidly connected to the corresponding branch of the trolley, and the rigid and substantially transverse component connecting each leg to the structure of the helicopter is a lateral arm which is integral with the leg and mounted so as to turn about a transverse axis on at least one structural element of the front part of the fuselage, by means of a ball pivot permitting angular oscillations about this transverse axis.

Preferably, the two branches of the trolley are mounted so as to pivot in relation to one another, in the manner of compass branches, about a pivot axis permitting the lateral embedding of each branch and of the corresponding lateral stabilizer on the structure of the helicopter, on the corresponding side of the fuselage.

In order to improve the rigidity of the stabilizing and towing trolley, especially with a view to the towing, the two branches of the trolley are advantageously joined to one another, substantially in their median part, by at least one rigid cross member articulated on each one of them, at least one of the two articulations of each cross member comprising a removable pivot axle, permitting the mounting of the corresponding cross member between the two branches after the placing in position of the latter on the structure of the fuselage.

Moreover, the pivot axis of the two branches in relation to one another is advantageously the axis of a ring constituting the operating component and formed by the joining of the ends of the two branches of the trolley, on the side opposite the lateral stabilizers.

Such a stabilizing and towing trolley therefore combines the increase in stability of the helicopter with the possibility of drawing the latter longitudinally and round a bend, in order to permit all the necessary movements on the moving alighting platform, and from the latter to a hangar. In the case of a bend, the lateral force exerted on the towing ring introduces into the fuselage of the helicopter a pivoting torque about a vertical axis in such a way that the wheel or wheels of the front undercarriage of the tricycle landing gear, which is or are of the drawn type, as well as the wheels of the towing trolley, likewise of the drawn type, adopt an equilibrium position to accompany the pivotal movement of the fuselage of the helicopter.

Such a stabilizing and towing trolley may, of course, likewise be used when the tricycle landing gear comprises a rear auxiliary undercarriage, consisting of a small wheel turning about a substantially vertical axis below the tail beam of the helicopter. In this case, in fact, the lateral stabilizers fixed at the ends of the branches of the trolley are made integral with the structure of the helicopter at lateral points situated at the rear of the main and lateral undercarriages of the helicopter. The latter may therefore be towed by the rear.

The subject of the invention is also a helicopter placed on board, having a tricycle landing gear, comprising two main and lateral undercarriages, and a front or rear auxiliary undercarriage, each equipped with at least one wheel or small wheel, and which is defined in that it further comprises a device for increasing stability according to the invention and as defined hereinabove, and in that its stable structure exhibits, on each one of the sides of the lower part of the fuselage, and in the direction turned towards the auxiliary undercarriage in relation to the main and lateral undercarriages, at least one structural element for fastening of the support of a lateral stabilizer of the corresponding auxiliary stabilizing gear.

In particular, when the tricycle landing gear of the helicopter placed on board comprises a front auxiliary undercarriage, with at least one drawn wheel turning about the axis of the leg of this front auxiliary undercarriage, and when the helicopter is equipped with a device for increasing stability comprising a stabilizing and towing trolley, or is intended to cooperate with such a device, of the type defined hereinabove, the ball pivot interposed or intended to be interposed between the lateral arm of a stabilizer and the structure of the helicopter is retained or intended to be retained in one of two coaxial and transverse orifices, each formed in the substantially longitudinal rib of one of two structural braces mounted on the structure of the helicopter, in such a manner that the transverse pivot axis of the branches of the trolley on the structure of the helicopter is situated in front of the turning axis of each one of the drawn wheels of the front auxiliary undercarriage.

On the other hand, when the helicopter placed on board according to the invention, and of the type of which the tricycle landing gear comprises a front auxiliary undercarriage, is equipped or intended to be equipped with a device for increasing stability comprising two lateral stabilizers, each one of which is mounted in a removable manner by manual pinning on the structure of the helicopter, as specified hereinabove, said stable structure of the helicopter then supports rigidly and, advantageously, projecting below the lower part of the fuselage and in a position fixed substantially at mid-distance between the front auxiliary undercarriage and the main and lateral undercarriages, two at least partially tubular parts of a rigid crossmember, preferably constituting the two lateral end parts of a same crossmember, and each one of which extends substantially horizontally and partially projecting laterally outside of one side respectively of the lower part of the fuselage, by its tubular portion which opens laterally towards the outside and is pierced by two coaxial holes of an axis which is substantially longitudinal and perpendicular to its axis, in order to receive by introduction fitting the lateral arm, exhibiting a passage likewise of longitudinal axis, of a stabilizer retained in position in relation to the structure of the helicopter by a pin engaged in said holes and in said passage, after placing of the latter in coincidence.

Finally, in the case where the helicopter placed on board according to the invention is equipped with a tricycle landing gear comprising a front auxiliary undercarriage, as well as with an auxiliary stabilizing gear having two lateral stabilizers which are retractable and as defined hereinabove, it is advantageous that the fuselage of the helicopter should carry, laterally overhanging towards the outside and on each side of the lower part of the fuselage, between the front auxiliary undercarriage and the main and lateral undercarriages, a small vessel which is faired and elongate in the longitudinal direction, which delimits an internal trap for accommodating at least partially the leg and the wheel or wheels of a retractable lateral stabilizer, the structure of the helicopter further exhibiting at least one first structural fastening for supporting the pivot axle of the corresponding leg and, to the rear of said first structural fastening, at least one second structural fastening for the support and articulation of an operating and crossbracing jack, likewise articulated elsewhere on said leg.

BRIEF DESCRIPTION OF THE DRAWING

The invention will be better understood and further advantages and features of the invention will become evident on reading the description given hereinbelow, of a plurality of preferred embodiments, which are described by way of example with reference to the accompanying drawings, in which:

FIG. 7 is a partial schematic side elevation view of a second embodiment of a helicopter placed on board, the auxiliary stabilizing gear of which comprises two lateral stabilizers, each of which is mounted so as to be removable individually and independently of the other on the helicopter, FIG. 8 is a schematic plan half-view of the helicopter of FIG. 1, FIG. 9 is a schematic front elevation half-view of the helicopter of FIGS. 7 and 8, FIG. 10 is a view on a larger scale, partly in cross-section and partly in front elevation, of the righthand lateral stabilizer of the helicopter of FIGS. 7 to 9, as well as of the adjacent part of the helicopter, on which adjacent part it is mounted so as to be removable.

DESCRIPTION OF PREFERRED EMBODIMENTS

Figure 1:
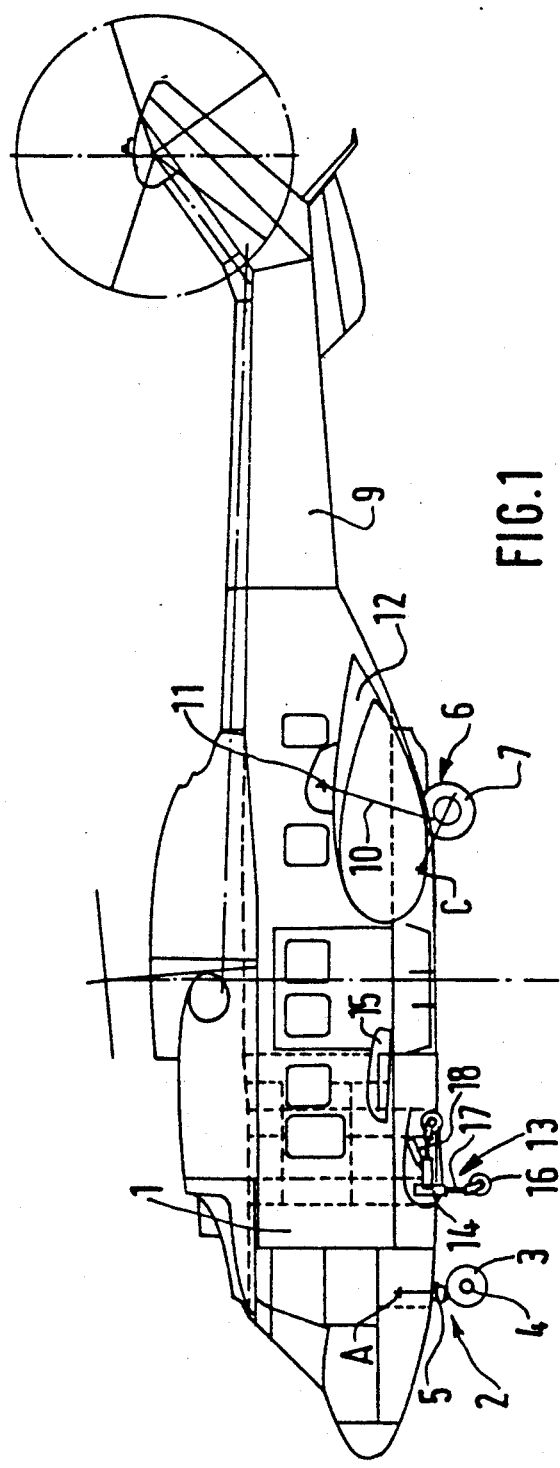
FIG. 1 is a schematic side elevation view of a helicopter placed on board, equipped with a device for increasing stability having an auxiliary stabilizing gear comprising two retractable lateral stabilizers.
Figure 2:
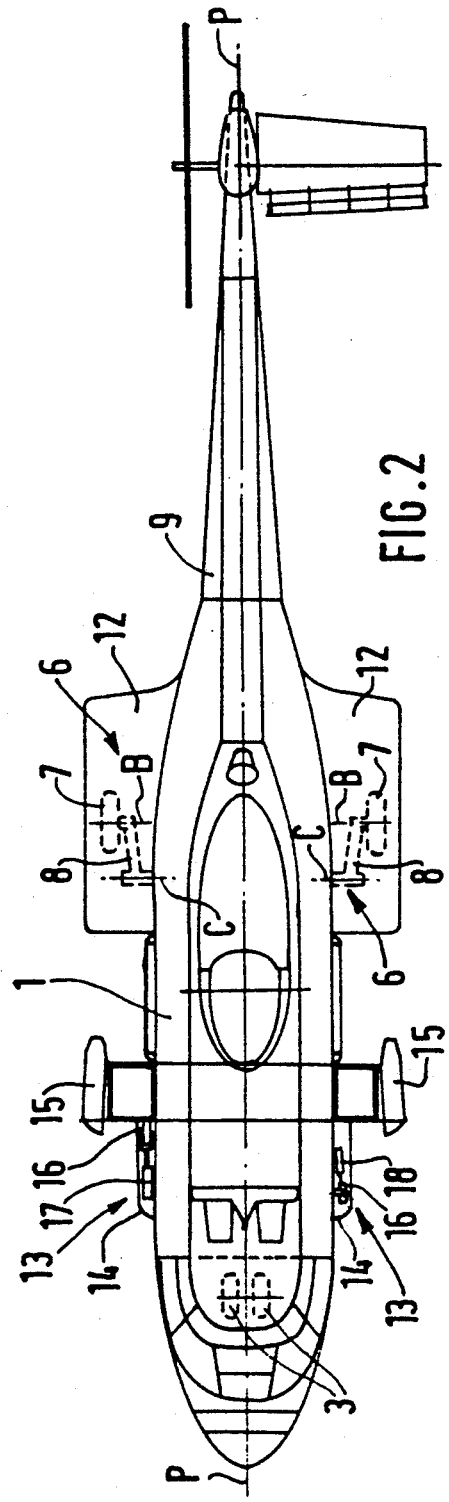
FIG. 2 is a plan view of the helicopter of FIG. 1.
Figure 3:
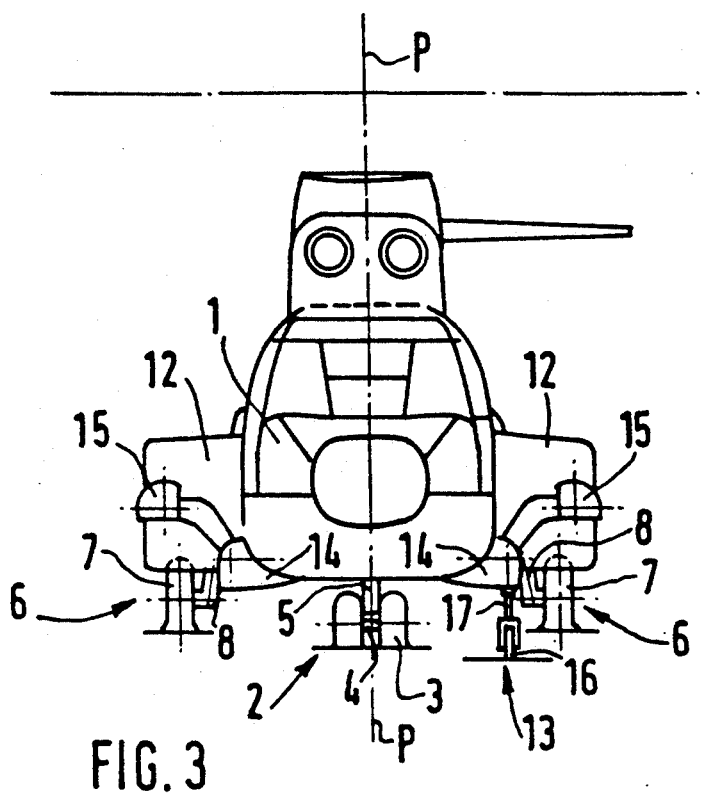
FIG. 3 is a partial front elevation view of the helicopter of FIGS. 1 and 2.

The helicopter placed on board, which is schematically represented in FIGS. 1 to 3, corresponds to the "navalized" version of a twin-turbine helicopter of medium tonnage, which is equipped with a retractable tricycle landing gear, comprising a front auxiliary undercarriage and two main and lateral undercarriages, and devised and constructed for a land-based application. On this helicopter, the fuselage of which, in its entirety, is indicated at 1, the front auxiliary undercarriage 2 is of the type comprising two wheels 3 which are twinned or mounted side by side in rotation about their common axis on a double and transverse spindle 4, integral with the lower end of a shock-absorber rod mounted axially sliding in a shock-absorber cylinder integrated in the tubular shaft of a front undercarriage leg 5. This leg 5 is mounted pivoting about the transverse axis A on the lower part of the stable structure of the helicopter, and can be displaced, in the longitudinal direction and by an operating jack, between two extreme positions, in each one of which it is locked, and one of which is a "gear extended" position (represented in FIGS. 1 to 3), in which the leg 5 is locked in the substantially vertical position and the wheels 3 have descended in relation to the fuselage 1, and of which the other position is a "gear retracted" position, in which the leg 5 and the wheels 3 are raised into a trap formed in a ventral bay of the helicopter. As represented in FIG. 1, the wheels 3 are mounted in the form of drawn wheels, the axis of the double spindle 4 of which is offset to the rear of the substantially vertical axis of the leg 5 in the extended position, and the movable assembly consisting of the two wheels 3 and the double spindle 4 is mounted to turn about the axis of the tubular shaft of the leg 5, and its angular position about this axis may be controlled by a direction control operated by the pilot, where a swivelable front undercarriage is involved. Furthermore, this front undercarriage 2 is equipped with a system (not represented) for braking the wheels 3. Of course, in the normal position of the latter, for maneuvering the front undercarriage just as for hauling forwards, the common axis of these wheels 3 is transverse, i.e., perpendicular to the longitudinal and median plane PP of the helicopter, and the two wheels 3 are symmetrical to one another in relation to this plane and at a small distance from the latter, in such a manner that the two wheels 3 occupy a central position below the front tip of the fuselage, i.e., below the floor of the crew's quarters.

Each one of the two main and lateral undercarriages 6 is a rocker undercarriage having a single drawn wheel 7 mounted in rotation laterally outside the rocker 8 on a spindle having a transverse axis B, at the lower and rear end of the substantially longitudinal rocker 8, which is inclined from front to rear and from top to bottom, and slightly from the inside towards the outside in relation to the plane PP, and which is mounted so as to pivot by its front end, about a transverse axis C, on the lower and rear part of the stable structure of the helicopter, in the rear part of the fuselage 1, just in front of its zone of connection to the tail beam 9 of the helicopter. The oscillations and deflections of the rocker 7 about its axis C, on alighting, on takeoff and on hauling, are damped by a shock-absorber jack (of any appropriate known type) represented schematically by the segment 10, and which is articulated by its lower end on the rocker 8, between the axes B and C, and by its upper end on a fixed point 11 of the structure of the helicopter, to the rear of the axis B and above the axis C, this shock-absorber jack 10 likewise controlling, by pivoting of the rocker 8 about its axis C, the passages of the corresponding main undercarriage 6 from the "gear extended" position represented in FIGS. 1 and 3, and in which the wheel 7 has descended to project below the fuselage 1, to the "gear retracted" position, in which the wheel 7 is raised within a profiled lateral vessel 12, overhanging the rear lateral part of the fuselage 1, on the corresponding side. Moreover, each wheel 7 is equipped with a brake.

This helicopter is furthermore equipped with an auxiliary stabilizing gear which is more specifically described hereinbelow, likewise with reference to FIGS. 4 to 6.

This auxiliary stabilizing gear comprises two lateral stabilizers 13, which, like the main undercarriages 6, are mounted symmetrically to one another on both sides of the vertical and median longitudinal plane PP of the helicopter, and each one set to project laterally towards the outside on one of the sides of the lower part of the fuselage 1, in one of two small profiled vessels 14, which have dimensions very much smaller than those of the rear vessels 12, and which are mounted laterally to overhang the lower part of the fuselage 1 and on both sides of the latter, in a longitudinal position situated between the main undercarriages 6 and the front auxiliary undercarriage 2, and, more specifically, between the latter and lateral weapon-carrying pylons 15, which themselves laterally project on the sides of the fuselage 1 substantially at mid-distance between the auxiliary undercarriage 2 and the main undercarriages 6.

Each lateral stabilizer 13 is mounted so as to be retractable into the corresponding small vessel 14, and comprises essentially a single wheel 16 mounted in the form of a drawn wheel at one end of a leg 17 which is itself mounted so as to pivot by its opposite end part on the structure of the helicopter, about a transverse axis, in such a manner as to be displaceable in a longitudinal general direction, between two extreme positions in which it is locked, and one of which is a "stabilizer extended" position, represented for the lefthand lateral stabilizer 13 of the helicopter in FIGS. 1 to 3, and in which the leg 17 of the stabilizer is vertical in order that the wheel 16, at its lower end, should have descended below the fuselage 1 and should be able to be supported on the moving alighting platform, and of which the other position is a "stabilizer retracted" position represented for the right-hand lateral stabilizer 13 in FIGS. 1 to 3, and in which the leg 17 has been raised substantially to the horizontal and towards the rear, by pivoting about its transverse axis of connection to the structure of the helicopter, by means of an operating actuator 18 which is likewise accommodated in the corresponding vessel 14, and in such a manner that the entire leg 17 and the greater part of the wheel 16 are retracted and accommodated within the vessel 14, the passage into the "stabilizer retracted" position being instructed by the pilot before takeoff, and this position being maintained during the flight, in order that the aerodynamic drag should be minimal, while the passage into the "stabilizer extended" position is instructed just after alighting, and this position is maintained while the helicopter remains set down on the moving platform, in order to ensure, when the rotor has stopped, the desired increase in stability, especially transverse stability, as far as a critical angle of approximately 30°.

Thus, each of the two stabilizing and lateral wheels 16 is attached permanently to the structure of the helicopter, by an essentially rigid support comprising the leg 17 and a rigid and transverse component for linking this leg 17 to the structure, this component being, in this example, the transverse pivot of the leg 17.

Figure 6:
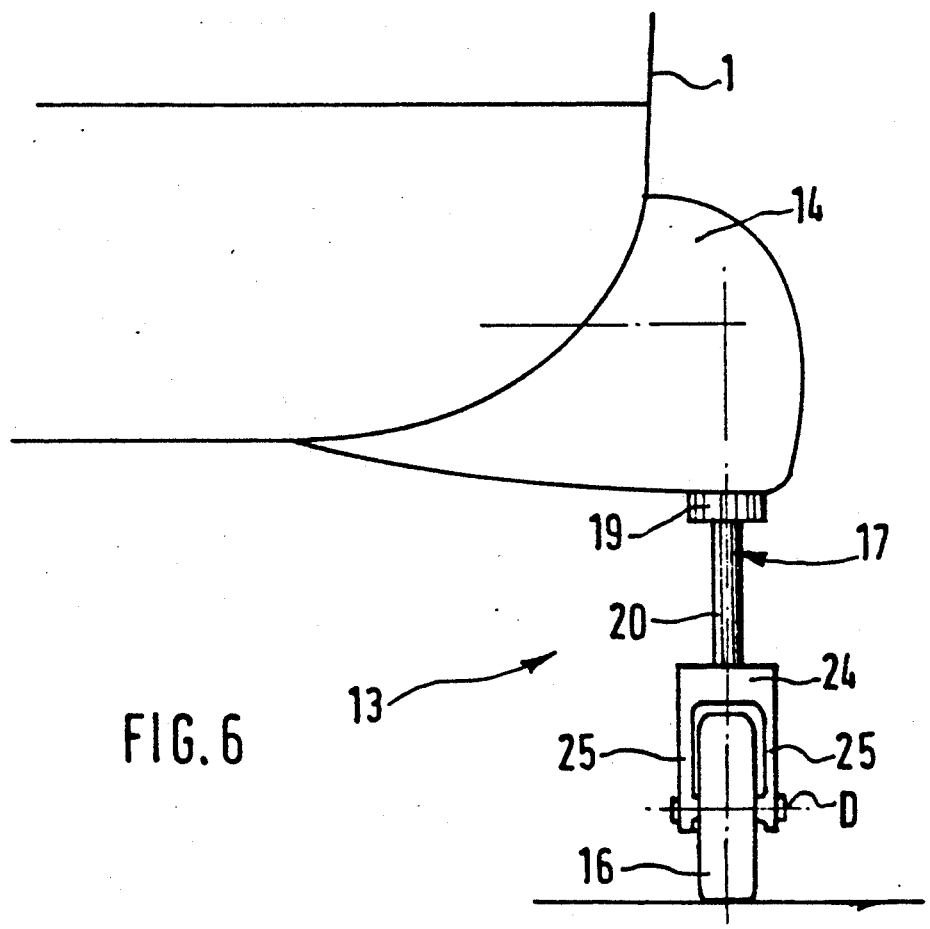
FIG. 6 is a front elevation view of the retractable stabilizer of FIGS. 4 and 5, which is the left-hand retractable stabilizer of the helicopter of FIGS. 1 to 3.
Figure 4:
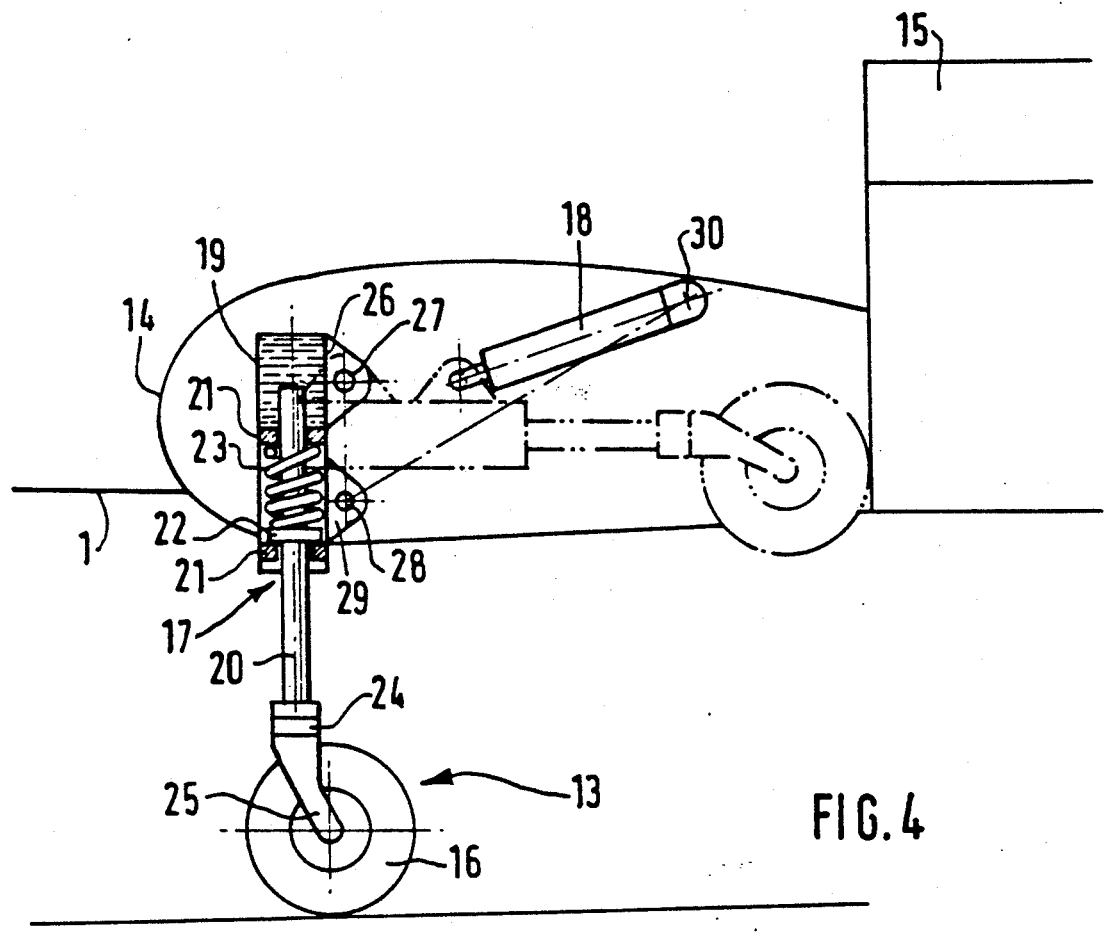
FIG. 4 is a schematic view, on a larger scale, partly in cross-section and partly in side elevation, of a retractable lateral stabilizer of the helicopter of FIGS. 1 to 3, and of its faired retraction vessel.
Figure 5:
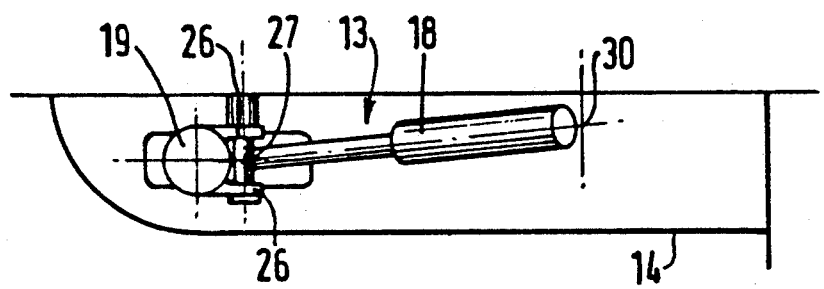
FIG. 5 is a schematic plan view, and through the faired vessel, of the lateral stabilizer of FIG. 4.

More specifically, and as represented in FIGS. 4 to 6, the leg 17 comprises a tubular shaft 19, of cylindrical general shape, and a rod 20 which is partially engaged and retained axially in the shaft 19, in such a manner as to be able at the same time to turn freely in the latter and about its axis, and to slide axially, over a limited stroke, in the shaft 19, while being restored resiliently to its maximum extension position towards the outside of the shaft 19.

To this end, FIG. 4 shows schematically two bearings 21 which are coaxial and internal to the shaft 19, which guide the part of rod 20 engaged in the shaft 19 in rotation on itself about its axis and in axial translation in the shaft 19, this internal part of rod 20 thus guided exhibiting an annular abutment 22 projecting radially between the two bearings 21 and which is pushed back towards the bearing 21 which is closer to the end of the shaft 19 traversed by the rod 20, by a helical spring 23 of very great stiffness, which surrounds the rod 20 without contact and is supported by its other end on the other bearing 21.

At the free end of its part external to the shaft 19, the rod 20 is integral with a wheel-carrying cap 24, the two parallel branches 25 of which are inclined on a single side of the axis of the rod 20, and between which the wheel 16 is mounted as a drawn wheel turning about an axis D which is horizontal and perpendicular to this axis of the rod 20, and offset on one side of this rod 20 by reason of the inclination of the branches 25.

Thus, the movable assembly consisting of the wheel 16, the cap 24 and the rod 20 can freely turn about the axis of the rod 20 and of the shaft 19 of the leg 17.

The end part of the shaft 19 on the side opposite the wheel 16 exhibits, towards the rear, two parallel and rigid ears 26 turning about a pivot shaft 27 which is horizontal and transverse and which is rigidly connected to the lower lateral part and on the corresponding side of the stable structure of the helicopter, in such a manner that the leg 17 in its entirety and together with the wheel 16 can pivot about the transverse axis of this pivot 27.

The actuator 18 which controls the pivotings of the leg 17 is a hydraulic or electrical operating and crossbracing jack, of any appropriate known type, which is articulated at the free end of its jack rod and by a transverse pivot 28 between two parallel and rigid fastening ears 29, carried towards the rear by the end part of the shaft 19 on the same side as the wheel 16, while the jack 18 is articulated by the closed end of its cylinder and on the structure of the helicopter at a fixed point 30 situated in the vessel 14, behind and above the pivot 27.

The raising of the leg 17 and of the corresponding wheel 16 from the extended position to the withdrawn and retracted position in the vessel 14 is thus ensured longitudinally and towards the rear by the withdrawal of the jack rod into the cylinder of the jack 18, and the descent of the leg 17 is controlled by the extending of the rod of the jack 18 out of its cylinder, the jack 18 being provided with hydraulic or mechanical locking at the end of the stroke and with hydraulic unlocking, if the jack concerned is a hydraulic jack fed from a hydraulic circuit of the helicopter, while this jack 18 is a jack provided with electrical or mechanical locking and with electrical unlocking if the jack concerned is an electrical jack fed from an electrical circuit of the machine, in order that this jack 18 ensuring the operation of the stabilizer 13 should be able at the same time to operate as strut for crossbracing the leg 17, especially in the "stabilizer extended" position.

Furthermore, in order to take account of the variations of the load of the helicopter, the shaft 19 likewise encloses a mechanism for the regulation of the axial position of the rod 20 in the shaft 19, in order to regulate the height of the wheel 16 in relation to the fuselage 1. Such mechanisms for regulating the height of the wheel are described hereinbelow with reference to FIGS. 4 and 10a.

FIG. 4 schematically represents such a mechanism operating by hydraulic jack. This jack consists of the upper part of the tubular shaft 19 forming the cylinder filled with a controlled volume of hydraulic fluid and the upper bearing 21 forming the piston. Under the control of the pilot and by a joint displacement of the 2 bearings 21, this device permits the ensuring of a regulation of the position of the rod 20 and consequently of the wheel 16, in height in relation to the fuselage 1.

On the helicopter represented in FIGS. 1 to 3 and equipped with an auxiliary stabilizing gear having two raisable lateral stabilizers, as described hereinabove likewise with reference to FIGS. 4 to 6, the support polygon is no longer delimited by a triangle, the vertices of which correspond to the points of support of each one of the wheels 7 of the main undercarriages 6 and of the two wheels 3 of the front auxiliary undercarriage 2 (considered as providing a single point of support), but, by virtue of the presence of the two lateral stabilizers 13, the support polygon is considerably broadened and delimited by the trapezium, the vertices of which correspond to the points of contact with the moving platform of the wheels 7 of the two main undercarriages 6 and of the wheels 16 of the two lateral stabilizers 13. This enlargement of the support polygon appears clearly on considering the plan view of FIG. 2.

The second embodiment of a helicopter placed on board, represented in FIGS. 7 to 9, likewise corresponds to a navalized version of a twin-turbine helicopter, the fuselage of which is indicated at 31, and which is equipped with a retractable tricycle landing gear, comprising a front auxiliary undercarriage 32 and two main and lateral undercarriages 36, and having been designed and constructed for a land-based utilization of the helicopter. As in the first example, each main and lateral undercarriage 36 comprises a single wheel 37, equipped with a brake, and turning about its axis, which is transverse, on a spindle projecting laterally towards the outside in relation to the vertical and median longitudinal plane PP of the helicopter/ on the lower end of an undercarriage leg 38 which is articulated on the lower and lateral part on the corresponding side of the stable structure of the helicopter, and raisable by an operating jack into a rear and lateral ventral bay of the fuselage 31. In relation to the main undercarriages of the first example, the only essential difference is that, in this second embodiment, each main undercarriage 36 is of the type involving direct sliding, and not involving a rocker.

As in the first embodiment, the front auxiliary undercarriage 32 comprises two twinned wheels 33, mounted in rotation about their common axis on a double and transverse spindle 34, which is connected to the lower end of a shock-absorber rod mounted axially sliding in a shock-absorber cylinder which is integrated into the tubular shaft of a front undercarriage leg 36, which is mounted so as to pivot on the front and central lower part of the stable structure of the helicopter, about a horizontal and transverse axis (perpendicular to the plane PP), and is maneuvered between the "gear extended" position, represented in FIGS. 7 to 9, and the "gear retracted" position in which the front undercarriage 32 is raised into a ventral and front central bay of the fuselage 31, by an operating and possibly cross bracing jack (not shown). As in the first embodiment, the wheels 33 are likewise mounted as drawn wheels, the axis of their double spindle 34 being offset to the rear of the substantially vertical axis of the leg 35 in the extended position; however, in contrast to the first embodiment, this front auxiliary undercarriage 32 is not of the type involving direct sliding, but of the rocker type, the double spindle 34 being integral with the rear end of a rocker 40, which is inclined from front to rear and from top to bottom in the position with the undercarriage extended, and articulated in its central part about a transverse axis on the lower end of the shock-absorber rod of the leg 35, while its front end is likewise articulated about a transverse axis on the end of a link rod 41 forming a directional compass with the rocker 40, and the other end of which is articulated on an annular component of the undercarriage leg 35 which turns about the axis of the tubular shaft of this leg 35, and which may be a direction control component, if the front undercarriage 32 is swivelable.

On such a retractable front undercarriage, of well known structure, the movable system consisting of the wheels 33, the double spindle 34, the rocker 40, the link rod 41 and the shock-absorber rod is mounted to turn about the axis of the tubular shaft of the leg 35, and its angular position can be controlled by the pilot, by operating the directional control, if this undercarriage is swivelable. Furthermore, the front undercarriage 32 is likewise equipped with a system (not shown) for braking the wheels 33.

As in the first embodiment, the front undercarriage 32 occupies a central position below the front tip of the fuselage 31, its two wheels 33 being, in the normal position, symmetrical to one another in relation to the plane PP and in immediate proximity to this plane, and the two main undercarriages 36 are symmetrical to one another in relation to the plane PP but to the rear of the fuselage 31, as far as a position in front of the zone of connection of the latter to the tail beam 39 of the helicopter, and in positions which are laterally very displaced from the plane PP, in such a way that each wheel 37 is just projecting laterally and below the lateral lower part of the fuselage 31, on the corresponding side, in the "gear extended" position.

In order to increase the stability of this helicopter, when it is set down on a moving platform, it is equipped, immediately after alighting thereof and until the moments which immediately precede the following takeoff, with an auxiliary and additional stabilizing gear, which comprises two lateral stabilizers 43, each of which is mounted in a removable manner on the helicopter by a manual mechanism incorporating a coupling and uncoupling pin, which may be easily and rapidly placed in position and withdrawn. These two stabilizers 43 are mounted symmetrically to one another, on both sides of the plane PP, and in such a way that each one of them is laterally projecting towards the outside and towards the bottom on one of the sides of the lower part of the fuselage 1, substantially at mid-distance, in the longitudinal direction, between the front undercarriage 32 and the main undercarriages 36.

These stabilizers 43 may be added to the helicopter after the alighting of the latter and may be removed manually just before its takeoff. They may likewise remain in position on the machine for the flight, after manual pivoting through a quarter of a turn on their fixing axis and pinning in this position, this being done just before takeoff. This mode of utilization is advantageous when the helicopter has to participate in a rescue or conservation mission from an aircraft carrier in the course of operations of catapulting aircraft. In this mission, the helicopter makes short flights, at a short distance from the aircraft carrier, and the weight of the stabilizers and the drag which they induce have only a secondary importance in relation to the period required for the flight readiness of the helicopter, which is a priority matter.

Each of the stabilizers 43 comprises essentially a stabilizer wheel 44, mounted as a drawn wheel at the lower end of a short vertical leg 45, which is integral with a lateral arm 46 by which the stabilizer 43 is fixed in a removable manner on the structure of the helicopter.

Thus, each of the two stabilizing and lateral wheels 44 is, in the position of use of the stabilizers 43, connected to the structure of the helicopter by an essentially rigid support consisting of the leg 45 and of its arm 46 performing the function of rigid and transverse component for linking this leg to the structure.

More specifically, and as represented in FIG. 10, the leg 45 comprises a tubular shaft 47, having the general shape of a frustum of a cylinder of circular cross-section, and a cylindrical rod 48 engaged axially in the central bore of the shaft 47, in which it can freely turn about its axis, and in which it is retained by a screw 49 passing through a washer 50 in abutment against the external face of the upper end of the shaft 47 and screwed into the upper end part of the rod 48, and the lower end of the rod 48, which passes below the shaft 47, is integral with a cap 51, the two parallel branches 52 of which are inclined on a same side of the axis of the rod 48. Between these two branches 52, the wheel 44 is mounted as a drawn wheel by its hub 53, provided with a rim 54 surrounded by a tire 55, and which is mounted to turn about a pivot 56 fixed between the ends of the two branches 52 of the cap 51, in such a way that the axis of this pivot 56 is thus offset on one side of the axis of the shaft 47 and of the rod 48. The movable assembly consisting of the wheel 44, of the cap 51 and of the rod 48 is thus freely turning about the axis of the shaft 47 and of the rod 48.

The lateral arm 46 of the stabilizer 43 is a tubular arm having an axis perpendicular to the axis of the shaft 47, and this arm is integral with the central part of the shaft 47 by a part 57 which is directly adjacent the shaft 47 and of substantially frusto-conical shape, converging towards this shaft. This arm part 57 is separated by a radial and peripheral shoulder 58 from an end part 59 of smaller external diameter and having a thinner wall, by which the arm 46 is fitted into a lateral end portion 61, open laterally towards the outside, in relation to the plane PP, of a tubular cross member 60 which is fixed and rigid and which is mounted so as to project below the lower part of the fuselage 1, and made integral by structural braces, of which only one is represented at 62, with the lower part of the stable structure of the helicopter, for example at the location of the fuselage frame.

When the thinned part 59 of the arm 46 is fitted to the greatest possible extent into the portion 61 of the cross member 60, of horizontal and transverse axis, and thus when the shoulder 58 comes into abutment against the external lateral end of the crossmember portion 61, which thus appears to project laterally below the lower part on the corresponding side of the fuselage, two holes which are coaxial and of the same diameter, of axis which is horizontal and parallel to the plane PP of the helicopter, which have been pierced in the portion 61 of the crossmember, come into coincidence with two holes which are of the same diameter and coaxial, of horizontal axis, which are pierced in the thinned part 9 of the arm 46, perpendicularly to the axis of the latter, in such a way that the introduction of a pin 63 into these holes in coincidence and through the arm 46 and the portion 61 of cross member 60, permits the rapid and easy fixing of the arm 46, and thus of the assembly of the lateral stabilizer 43, to the cross member 60 of the helicopter. The fixing of each lateral stabilizer 43 on the corresponding side of the helicopter by manual pinning may therefore be effected very rapidly and easily, immediately after alighting, and, likewise the removal of the stabilizers 43 by manual unpinning may be ensured very rapidly just before takeoff, by personnel assisting on the moving platform.

In the case where it is desired to preserve the stabilizers 43 on the helicopter for the flight, it is appropriate, just before takeoff, after having withdrawn the pin 63, to cause manual pivoting of each stabilizer 43 about the axis of the cross member 60, through a quarter of a turn towards the rear, and to reposition each pin 63 in the holes existing through the arm 46 and in two other holes (opposite) of vertical axis which are provided correspondingly in the portion 61 of the cross member 60. After alighting, the reverse operations are performed in order to replace the stabilizers 43 in the active position.

In order to adjust the height of the stabilizer 43 to the load of the helicopter, which is variable, and thus, in order to adjust the height of the wheel 44 in relation to the fuselage 1, the means ensuring the mechanical retention of the rod 48 in the shaft 47 may be combined with a mechanism for regulating the axial position of this rod 48 in the shaft 47, or themselves arranged in such a mechanism. For example, the partial unscrewing of the screw 49 permits the lowering of the rod 48 in the shaft 47, if the washer 50 is integral with this shaft 47, and thus the extension of the leg 45 by lowering the wheel 44.

Preferably, however, this mechanism for height regulation is a mechanism having a toothed wheel and endless screw as described hereinbelow with reference to FIG. 10a, which represents, in axial and vertical cross-section, the best example known to the applicant at the present time, of an additional stabilizer according to this second embodiment.

Figure 10A:
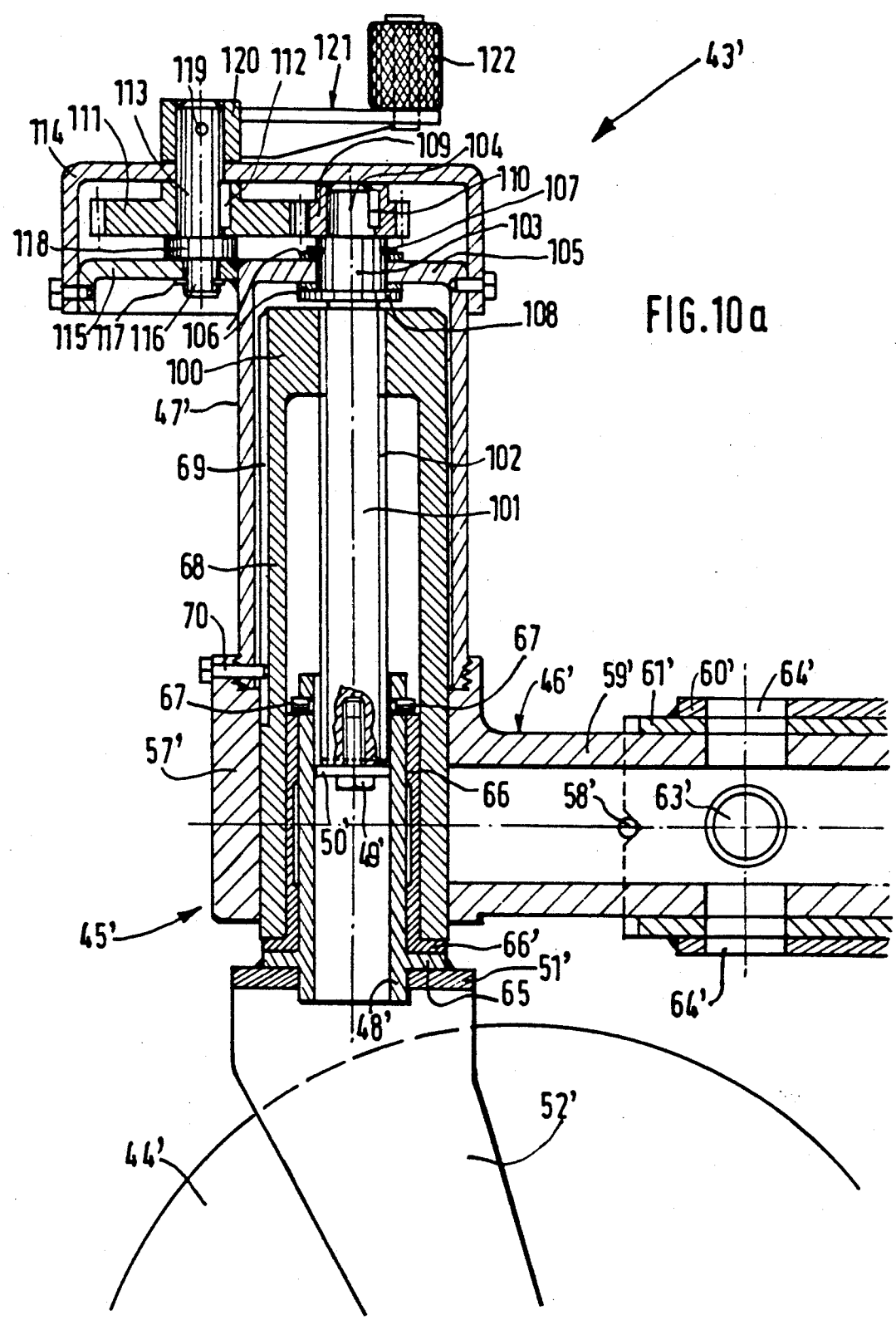
FIG. 10a represents, on a different scale and in vertical axial cross-section, a variant of the stabilizer of FIG. 10 which is equipped with a mechanism for regulating, in height, the wheel of the stabilizer in relation to the fuselage of the helicopter.

In FIG. 10a, the cap 51, the two branches 52' of which support the stabilizer wheel 44' mounted as a drawn wheel, is welded at the lower end of a tubular cylindrical spindle 48' and at an external radial flange 65 exhibited by this spindle 48' in proximity to its lower end. This spindle 48' is engaged and retained axially in a bronze shouldered bush 66, which is tightly fitted into the lower end part of a tubular cylindrical slider 68, in such a way that the spindle 48' can turn in the bush 66 and in the slider 68, about their common axis, the axial retention of the spindle 48' in the bush 66 being ensured by arresting pins 67, which are partially accommodated in radial bores formed in the tubular spindle 45' and project radially towards the outside in such a manner as to come into abutment against the upper end of the shouldered bush 66. The shoulder 66' of the bush 66, projecting radially towards the outside at the lower end of this bush 66, is in abutment against the lower end of the slider 68, which is mounted so as to slide axially in the stabilizer leg 45', consisting essentially of the cylindrical tubular shaft 47', screwed by its lower end into the upper part of an external lateral portion 57', of cylindrical general shape, of the lateral arm 46' of the stabilizer 43'. This external lateral portion 57' of the arm 46' is pierced by a bore coaxial to the internal bore of the tubular shaft 47' and in which the slider 68 is mounted for gentle axial sliding and guided in translation, without any possibility of rotation in the shaft 47' and in the external portion 57' of the lateral arm 46', by the cooperation of a longitudinal groove 69, formed in the external lateral wall of the slider 68, and of a headed screw 70, screwed through the parts of the shaft 47' and of the arm portion 57' which are themselves screwed one into the other, and the end of the screw rod 70 of which opens into the groove 69.

The upper part 100 of the slider 68 is pierced by an axial counterbore of smaller diameter than the main bore in which are engaged the bush 66 in the spindle 48', and this counterbore is tapped with a thread complementary to that of an endless screw 101 with which it is in engagement. The endless screw 101, the thread 102 of which is, for example, formed by two flat threads, extends axially within the slider 68 and its lower end, which can penetrate freely within the tubular spindle 48', carries a washer 50' maintained by an axial screw 49' and serving as abutment for the end of the stroke of the screw 101, limiting the extension of the slider 68 towards the outside of the shaft 47' and of the arm portion 57' when the screw 101 is turned on itself, until the washer 50' comes into abutment against the upper part 10 of the slider 68.

The upper part of the endless screw 101 is not threaded, but arranged in two shaft portions which are cylindrical and coaxial 103 and 104, offset axially and connected by a shoulder. By the shaft portion 103, of diameter greater than that of the shaft portion 104, the endless screw 101 is mounted to turn about its axis in a bearing formed by the base 105 of the upper end of the shaft 47' which is pierced by an axial passage accommodating the shaft portion 103, and by two bronze rings 106 which surround the shaft portion 103 and are axially wedged one in the upper position, between the upper face of the base 105 and a circlip 107 locked in a peripheral throat of the shaft portion 103, and the other, in the lower position, between the lower face of the base 105 and a radial shoulder 108 which, on the endless screw 101, separates the threaded part 102 from the shaft portions 103 and 104. A spur-toothed pinion 109 is mounted and connected in rotation by a key 110 on the shaft portion 104, and this pinion 109 is in engagement with a toothed wheel 111, which is itself fixed in rotation, by the key 112, with a shaft 113, of axis parallel to the axis of the screw 101, and mounted in rotation about its axis in an auxiliary casing 114 which is screwed, on the ',-) one hand, on the shaft 47' and, on the other hand, on an auxiliary base 115 which is welded to the upper base 105 of the shaft 47' and laterally in the extension of this base 105, and which closes the casing 114 in which the pinion 109, the toothed wheel 110 and the shaft portions 103 and 104 of the screw 101 are also accommodated and protected. The shaft 113 exhibits a lower part of smaller diameter 116 which traverses the auxiliary base 115 forming a bearing and is retained in position by a circlip 117 locked in a throat of this part 116 just below the lower face of the base 115, against which the shaft 113 rests by a shoulder 118. The toothed wheel 111 also has its hub mounted between the shoulder 118, against which it rests, and the casing 114, just as the pinion 109 has its hub mounted between the shoulder for connecting the shaft portions 103 and 104, against which it rests, and the casing 114. Finally, the upper part of the shaft 113 traverses the casing 114, forming a bearing, and projects above this casing 114, where it is retained by a transverse pin 119 in the hub 120 of a crank 121 which is grooved and has a control handle 122.

Thus, by the manual rotation of the crank 121, control takes place of the rotation of the shaft 113 and of the toothed wheel 111 about their common axis. This rotation is transmitted to the pinion 109 and to the endless screw 101, which turn about their common axis. This rotation of the endless screw 101, fixed in the axial position in the shaft 47', involves the axial displacement, in translation, of the slider 68 in relation to the shaft 47' and to the arm 46'. This results in an axial displacement, with the slider 68, of the wheel 44' of the cap 51' and of the spindle 48', which form a movable assembly mounted to turn in the shoulder bush 66 which is embedded in the slider 68. It is thus possible to regulate the height of the wheel 44' in relation to the fuselage, with which the stabilizer 43' is made integral by its lateral arm 46' which, in addition to the external lateral part 57', comprises the internal lateral part 59' which is tubular and is slidingly fitted into the lateral end tubular portion 61' which is integral, by welding, with the tubular cross member 60' rigidly connected to the structure of the helicopter. This slidable fitting is limited by the coming of a stud 58', projecting towards the outside on the arm portion 59', into abutment in a V notch formed in the external lateral edge of the tubular part 61' connected to the cross member 60', in such a way that it is then possible manually to engage the pin 63' into coincident holes pierced, on the one hand, in the arm portion 59' and, on the other hand, in the tubular part 61' and the cross member 60'. If it is desired to fix the stabilizer 43' by pinning on the helicopter rotation through 90° about the horizontal and transverse axis of the arm 46', first of all the pin 63' is withdrawn, the leg 45' is pivoted through a quarter of a turn about the axis of the arm 46' so as to bring the two opposite holes 64' of vertical axis which are pierced in the cross member 60' and its end portion 61' into coincidence with the opposite holes pierced in the arm portion 59' and the pin 63' is replaced.

In the second example, likewise, the consideration of FIG. 8 permits it to be seen that the support polygon of the land-based version of the helicopter, delimited substantially by a triangle, the three vertices of which correspond to the points of support on the ground of the two wheels 37 of the main undercarriages 36 and of the wheels 33 of the front auxiliary undercarriage 32, is considerably enlarged, in the navalized version, and is, in this case, substantially delimited by a pentagon, the vertices of which correspond to the points of support on the moving platform not only of the wheels 37 and 33 of the main undercarriages 36 and of the front auxiliary undercarriage 32, but also of the wheels 44 of the lateral stabilizers 43, the track of which is, in this example, slightly greater than that of the two main undercarriages 36 (see also FIG. 9), in contrast to the first embodiment, in which the track of the two lateral stabilizers 13 was less than that of the two main undercarriages 6 (see FIG. 3). The result of this is that, in this second example, the critical angle of static stability can be brought to 32°, by the addition of lateral stabilizers 43, the weight of each one of which is very limited and may be maintained at less than 8 kg.

In the two preceding embodiments, the auxiliary stabilizing gear having two lateral stabilizers undoubtedly procures an increase in stability, especially transverse stability, of the helicopter when the latter is set down on a moving platform, under static conditions just as on hauling on this platform, and this stabilizing gear furthermore permits such hauling. However, other systems and/or toolings are necessary in order to transmit to the helicopter the motive power required for its movement by hauling on this platform, and in particular for drawing it longitudinally or round a bend.

In the third embodiment, described with reference to FIGS. 11 to 13, the auxiliary stabilizing gear is arranged in the form of a stabilizing and towing trolley, which is coupled in a removable manner by a quick-acting coupling and uncoupling mechanism to the helicopter after its alighting, and uncoupled from the helicopter just before its takeoff, and which permits the towing of the helicopter on the moving platform while preserving for it an improved stability, in particular against crosswinds, and even when traveling round a bend.

Figure 11:
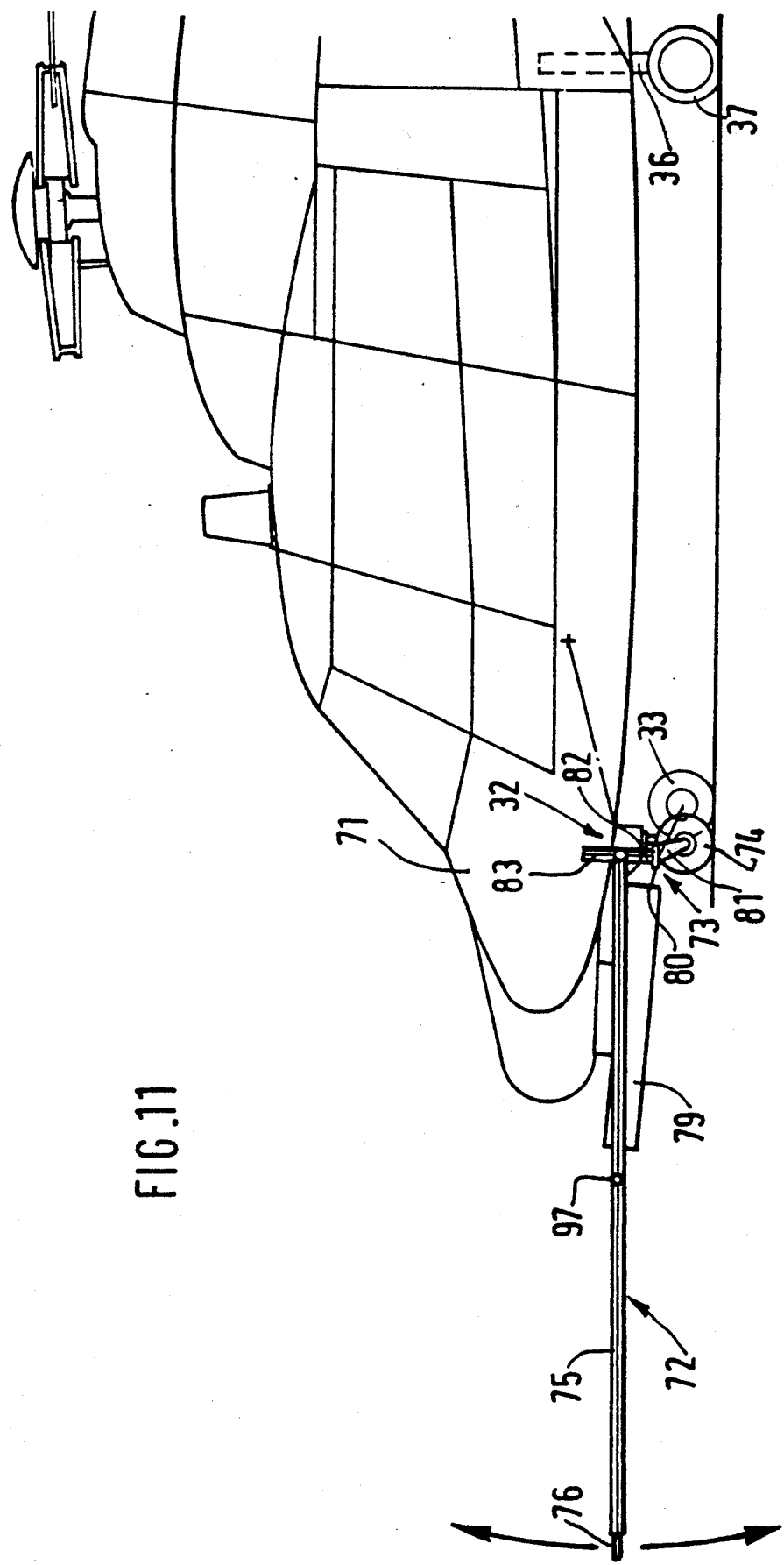
FIG. 11 is a schematic view, in side elevation, of a third embodiment of a helicopter placed on board and equipped with a stabilizing and towing trolley.
Figure 12:
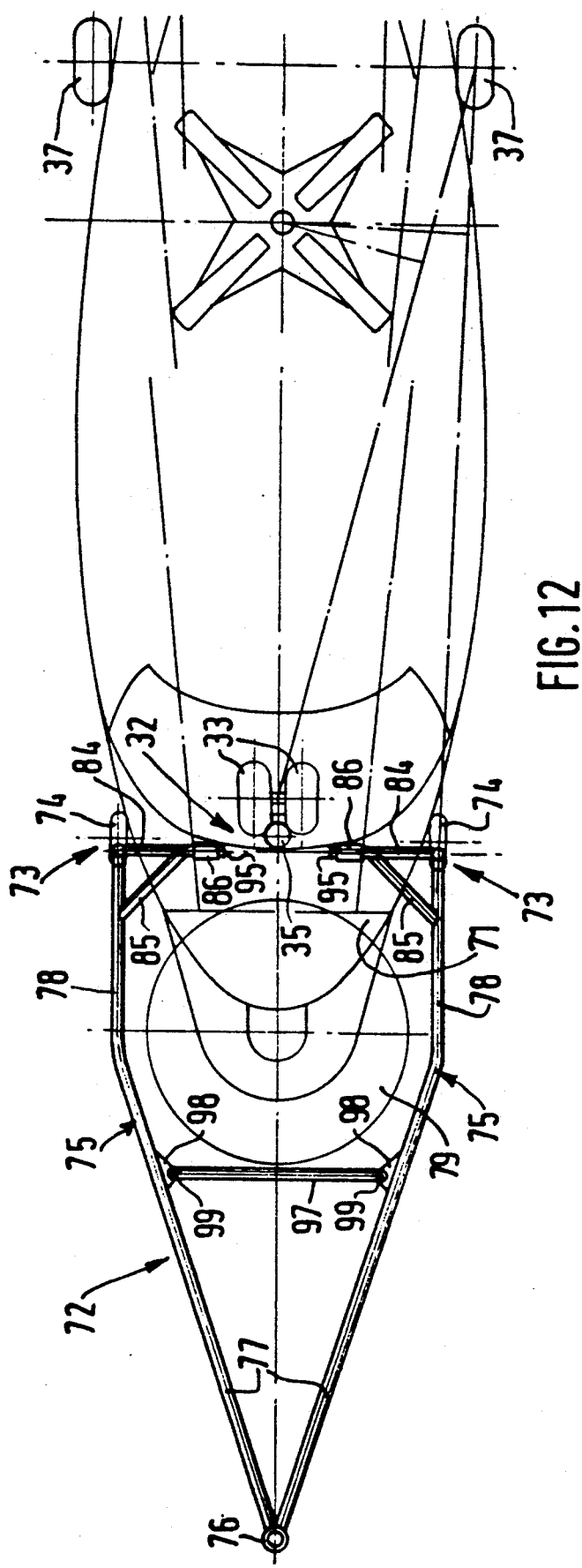
FIG. 12 is a schematic plan view of the helicopter and of the trolley of FIG. 11.
Figure 13:
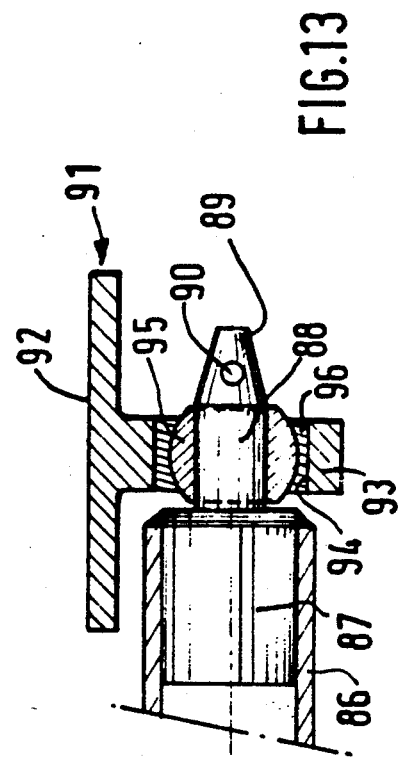
FIG. 13 is a schematic and partial view of the mechanism for catching one of the two branches of the trolley of FIGS. 11 and 12 on the structure of the helicopter of these same figures.

The helicopter placed on board which is represented in FIGS. 11 and 12 is substantially the same as that of FIGS. 7 to 9, and it is equipped with the same tricycle landing gear, with a front auxiliary undercarriage 32 incorporating a rocker, having two twinned wheels 33, and having longitudinal lifting towards the rear, below the front central part of the fuselage 71, and with two main and lateral undercarriages 36, each of which is single-wheeled, with direct sliding, and with lifting towards the rear and towards the interior into a rear lateral bay of the fuselage 71.

The stabilizing and towing trolley, designated in its entirety by the reference 72, comprises two lateral stabilizers 73, each one of which is equipped with a stabilizing wheel 74, and is integral with the rear end of one of two curved towing bars 75. These two curved bars 75 are joined to one another at the location of their front ends forming a coupling and towing ring 76, and they are articulated to one another as compass branches, pivoting in relation to one another about the axis of the ring 76. As represented in FIG. 12, the two bars 75, which constitute the two lateral branches of the trolley 72, are curved in such a manner that in the position of use of the latter the front and rectilinear parts 77 of the bars 75 form a V diverging towards the rear parts 78, which are likewise rectilinear but oriented longitudinally in relation to the helicopter, in such a manner as to release between the two bars or branches 75 a space which is sufficient to avoid any interference between the branches 75 and the nose of the helicopter, which is equipped with a radome 79 suspended below the front tip of the fuselage 71.

As in the preceding embodiment, the wheel 74 of each stabilizer 73 is mounted as a drawn wheel, which turns about its axis between the ends of the two branches 81 of a cap 80 which is integral with the lower end of a cylindrical rod 82, which is mounted to turn about its axis in a tubular shaft 83 of vertical leg, and which is integral, in this embodiment, substantially to the extent of one half of its height, with the rear end of the corresponding bar 75, the branches 81 of the cap 80 being inclined on the same side of the axis of the shaft 83 and of the rod 82, in such a manner that the latter constitutes, together with the cap 80 and the wheel 74, a movable assembly turning freely about the axis of the shaft 83, and likewise in such a manner that the axis of rotation of the wheel 74 is offset on the same side of the axis of the shaft 83. As in the preceding embodiments, the leg formed by the shaft 83 and the rod 82 encloses a mechanism for regulating the axial position of the rod 82 in the shaft 83, in order to adjust the height of the stabilizer 73, and thus the height of the wheel 74 in relation to the fuselage 71, as a function of the variations of the load of the helicopter, and, furthermore, the shaft 83 may contain a resilient component of high stiffness tending to push back the rod 82 and the wheel 74 downwards, in order to promote the support on the moving platform.

In this embodiment, likewise, the shaft of leg 83 is rigidly integral, substantially to the extent of one half of its height, with a lateral arm 84, the axis which is horizontal and substantially perpendicular to the rear part 78 of the corresponding bar 75. However, this arm 84 is furthermore rigidly connected to this rear part 78 of the corresponding bar 75 by a horizontal tie 85, and its free end part, turned towards the other stabilizer 73 of the trolley 72, is conformed as sleeve 86, in which a massive connecting piece 87 is retained, for example by welding (see FIG. 13). This connecting piece 87 is extended outside the sleeve 86 by a thinned and cylindrical pivot shaft 88, which terminates in a frusto-conical tip 89 pierced by a transverse hole for accommodating a pin 90.

For the coupling of such a trolley 72 to the helicopter, the rigid structure of the latter exhibits, slightly in front of the leg 35 of the front undercarriage 32, in the extended position, and laterally of each side of the latter, a structural brace 91, schematically represented in FIG. 13, and which comprises a horizontal and flat base 92 rigidly connected to the remainder of the structure of the helicopter, as well as a vertical rib 93, projecting below the base 92 and extending in the longitudinal direction below the helicopter, and a circular opening 94, of transverse axis, is pierced in the rib 93 and coaxial and identical with the opening 94 exhibited by the rib of the other structural brace, symmetrically in relation to the vertical and median longitudinal plane of the helicopter. This opening 94 is equipped with a ball 95, the external crown 96 of which is made integral by crimping or any other means within the bore 94. Into the internal bore of the ball 95 there is introduced the cylindrical pivot 88, the pierced tip 89 of which passes towards the interior of the rib 93, on the side opposite the sleeve 86 of the corresponding arm 84. Thus, the placing in position of the pin 90 through the tip 89 ensures the retention of the pivot 88 within the ball 95, which is itself made integral by its external crown 96 with the brace 91, and thus the linkage of the arm 84 to the structural brace 91 by a coupling which can be placed in position rapidly and which permits not only the pivoting of the arm 84, and thus of the bars 75 and of the trolley 72 in its entirety, downwards or upwards, about a transverse axis situated slightly in front of the axis of the leg 35 of the front undercarriage 32 and about which the wheels 33 of this undercarriage turn (see FIG. 12), but also angular oscillations about this transverse axis.

The trolley 72 is used in the following manner: before the alighting of the helicopter, the two branches 75 of the trolley are widely separated from one another by relative pivoting about the axis of the handling ring 76. As soon as the helicopter has alighted, assistance personnel attached to the moving platform bring the two branches 75 towards one another and on both sides of the nose of the helicopter, and then embed each one of the two branches 75 on the stable structure of the helicopter by introducing the pivot 88 at the internal end of the corresponding lateral arm 84 into the internal bore of the ball 95 fixed in the corresponding structural brace 91, and then positioning a retaining pin 90, as specified hereinabove. In order then to prevent a situation in which the two branches 75 of the trolley are not able to become separated from one another, and also to rigidify the trolley 72 with a view to the towing of the helicopter on the moving platform, the two branches 75 are joined to one another, at the location of their front parts 77 and in proximity to their bends, by a rigid cross member 97, articulated by each of its ends for pivoting on a fastening 98, which is integral with one of branches 75, and projecting towards the interior of the two branches substantially in the middle plane which they define, with the aid of a pivot axle 99. One of the two axles 99, which are substantially perpendicular to the middle plane defined by the two branches 75, is removable, in such a manner that the articulated cross member 97 is uncoupled from one of the branches 75, and permits their separation before the coupling of the trolley 72 to the helicopter, and this removable axle 99 is placed in position after the positioning of the two branches 75 and of the corresponding stabilizers 73 on the fuselage of the helicopter.

Thus, the trolley 72 combines the increase of stability of the helicopter with the possibility of towing it by longitudinal and even transverse traction, in order to drive it round a bend. In this last configuration, the lateral force exerted on the towing ring 76 introduces into the fuselage 71 a pivoting torque about a vertical axis, and the two wheels 33 of the front undercarriage 32 as well as the wheels 74 of the towing trolley 72, which are all drawn wheels, automatically adopt an equilibrium position accompanying the pivotal movement of the fuselage 71.

In this example, it is found that the position of the stabilizing wheels 74 slightly in front and laterally in relation to the wheels 33 of the front undercarriage 32, defines, with the two wheels 37 of the main undercarriages 36, a support polygon which is trapezoidal and considerably more greatly widened than the substantially triangular support polygon defined by the tricycle landing gear of the helicopter.

At the expense of a structural reinforcement of a cost and of a weight which are limited, corresponding solely to the installation of the structural braces 91, and with the aid of a towing and stabilizing trolley 72, the structure of which is simple, the production cost of which is low and the application of which is easy, it is possible to impart to the helicopter a critical angle of lateral stability exceeding 30°.

We claim:

1. A device for increasing the stability of a helicopter having a tricycle landing gear (2, 6) constituted by two main and lateral undercarriages (6) and one auxiliary undercarriage (2) when said helicopter is set down on a moving platform, said device comprising an auxiliary stabilizing gear operative only when said helicopter is landing with a rotor thereof rotating or stopped, said stabilizing gear comprising at least two lateral stabilizers (13), each of said lateral stabilizers comprising a rigid support (17, 27) having an end part which supports at least one stabilizing wheel (16) for contact with said platform, said rigid support (17, 27), at least in position of use, being integral with a stable structure of said helicopter at a lower part of a fuselage (1) of said helicopter, said rigid supports being offset laterally one on each side of a vertical and median longitudinal plane (PP) of said helicopter, in the direction turned towards and auxiliary undercarriage (2) in relation to said main an lateral undercarriages (6) of said tricycle landing gear, in such a manner that said at least one stabilizing wheel (16) is supported on said moving platform, on both sides of said longitudinal and median plane of said helicopter (PP) when said helicopter rests on said platform with said tricycle landing gear (2, 6), wherein each lateral stabilizer (13, 43) comprises a mechanism for regulating the height of at least one stabilizing wheel (44') in relation to the fuselage, said mechanism comprising a toothed wheel (111) operated by a crank (121) and in engagement with a pinion (109) for entrainment in rotation of an endless screw (101), in an axial position fixed in relation too the tubular shaft (47') in which it is at least partially accommodated and in engagement with a slider (68) guided in axial translation in said tubular shaft (47') and in which a spindle (48') supporting the stabilizing wheel or wheels (44') is mounted so as to turn.

2. The device as claimed in claim 1, wherein the auxiliary stabilizing gear is an additional gear mounted on the helicopter in addition to the tricycle landing gear (32, 36) after alighting on said moving platform, and demounted before the takeoff of the helicopter, and with which the rigid support (45, 46) of each stabilizer (43) is made integral laterally in a removable manner (63) on the structure (60) of the helicopter.

3. The device as claimed in claim 2, wherein the support (45, 46) of each stabilizer (43) is made integral in a removable manner on said structure by a manually operated quick-acting coupling and uncoupling mechanism (57, 58, 59, 61, 63).

4. The device as claimed in claim 3, wherein said substantially transverse rigid component connecting said leg (45) to said structure of the helicopter is a lateral arm (46) which is integral with the leg (45) and which is fitted onto and/or into at least one element (60) of said structure, on which it is retained in a removable manner by the manual engagement of at least one pin (63) in coincident orifices formed in the arm (46) and in at least one structural element (60).

* * * * *